(12) United States Patent
Kataoka

(10) Patent No.: US 9,200,926 B1
(45) Date of Patent: Dec. 1, 2015

(54) DISPLACEMENT DETECTING DEVICE

(71) Applicant: DMG MORI SEIKI CO., LTD., Yamato-Koriyama, Nara (JP)

(72) Inventor: Motofumi Kataoka, Isehara (JP)

(73) Assignee: DMG MORI SEIKI CO., LD., Yamato-Koriyama (JP)

( * ) Notice: Subject to any disclaimer, the term of this patent is extended or adjusted under 35 U.S.C. 154(b) by 0 days.

(21) Appl. No.: 14/736,611

(22) Filed: Jun. 11, 2015

(30) Foreign Application Priority Data

Jun. 11, 2014 (JP) .................................. 2014-120210

(51) Int. Cl.
*G01D 5/30* (2006.01)

(52) U.S. Cl.
CPC ...................................... *G01D 5/30* (2013.01)

(58) Field of Classification Search
CPC ........................... G01D 5/34746; G01D 55/30
See application file for complete search history.

(56) References Cited

U.S. PATENT DOCUMENTS

| 6,547,139 B1 * | 4/2003 | Havens | G02B 27/0075 235/454 |
| 2014/0070752 A1 * | 3/2014 | Otsuji | G05B 19/19 318/603 |

FOREIGN PATENT DOCUMENTS

JP          2004-170153 A       6/2004

* cited by examiner

*Primary Examiner* — Tony Ko
(74) *Attorney, Agent, or Firm* — Oliff PLC

(57) ABSTRACT

To provide a displacement detecting device capable of achieving an improvement in a measurement range without being restricted by an origin mark or an origin signal. A displacement detecting device 1 includes a scale 2, scale marks, a displacement detecting section 9, a displacement calculation section 4, a movement detecting section 10, a movement amount calculation section 5, a comparison/calculation section 6, and an absolute position calculation section 7. The comparison/calculation section 6 differentiates, when the displacement detecting section 9 or scale 2 moves in a track direction Y1, a displacement amount calculated by the displacement calculation section 4, thereby calculating a second-order differential amount in the track direction Y1. The absolute position calculation section 7 calculates an absolute position in a measurement direction X1 with respect to the scale 2, based on the second-order differential amount calculated by the comparison/calculation section 6, and outputs the absolute position.

7 Claims, 21 Drawing Sheets

FIG. 18

CORRECTION VALUE TABLE (nm)

|  | | CORRECTION VALUE (nm) |
|---|---|---|
| ABSOLUTE POSITION (nm) | 1 | 0.5 |
| | 2 | 0.3 |
| | 3 | 0.1 |
| | 4 | 0.2 |
| | 5 | 0.1 |
| | . | . |
| | . | . |
| | . | . |
| | . | . |
| | . | . |
| | . | . |
| | . | . |
| | . | . |
| | . | . |

FIG. 20

CORRECTION VALUE TABLE IN FIRST MEASUREMENT DIRECTION X1 (nm)

| | | ABSOLUTE POSITION IN SECOND MEASUREMENT DIRECTION Y1 (nm) | | | | | | | | | |
|---|---|---|---|---|---|---|---|---|---|---|---|
| | | 1 | 2 | 3 | 4 | 5 | 6 | 7 | . | . | . |
| ABSOLUTE POSITION IN FIRST MEASUREMENT DIRECTION X1 (nm) | 1 | 0.1 | 0.2 | 0.3 | 0.3 | 0.2 | 0.2 | 0.1 | . | . | . |
| | 2 | 0.1 | 0.1 | 0.2 | 0.1 | 0.2 | 0.1 | 0.1 | . | . | . |
| | 3 | 0.2 | 0.2 | 0.1 | 0.2 | 0.1 | 0.2 | 0.2 | . | . | . |
| | 4 | 0.3 | 0.3 | 0.2 | 0.3 | 0.2 | 0.2 | 0.3 | . | . | . |
| | 5 | 0.4 | 0.3 | 0.3 | 0.4 | 0.3 | 0.1 | 0.1 | . | . | . |
| | 6 | 0.5 | 0.4 | 0.4 | 0.5 | 0.4 | 0.3 | 0.2 | . | . | . |
| | 7 | 0.1 | 0.3 | 0.2 | 0.3 | 0.3 | 0.4 | 0.3 | . | . | . |
| | . | . | . | . | . | . | . | . | . | . | . |
| | . | . | . | . | . | . | . | . | . | . | . |
| | . | . | . | . | . | . | . | . | . | . | . |
| | . | . | . | . | . | . | . | . | . | . | . |
| | . | . | . | . | . | . | . | . | . | . | . |
| | . | . | . | . | . | . | . | . | . | . | . |

FIG. 21

CORRECTION VALUE TABLE IN SECOND MEASUREMENT DIRECTION Y1 (nm)

| | | ABSOLUTE POSITION IN SECOND MEASUREMENT DIRECTION Y1 (nm) | | | | | | | | | |
|---|---|---|---|---|---|---|---|---|---|---|---|
| | | 1 | 2 | 3 | 4 | 5 | 6 | 7 | . | . | . |
| ABSOLUTE POSITION IN FIRST MEASUREMENT DIRECTION X1 (nm) | 1 | 0.3 | 0.2 | 0.1 | 0.3 | 0.4 | 0.5 | 0.2 | . | . | . |
| | 2 | 0.1 | 0.1 | 0.2 | 0.4 | 0.1 | 0.4 | 0.1 | . | . | . |
| | 3 | 0.3 | 0.3 | 0.1 | 0.3 | 0.3 | 0.3 | 0.2 | . | . | . |
| | 4 | 0.2 | 0.4 | 0.1 | 0.5 | 0.4 | 0.1 | 0.3 | . | . | . |
| | 5 | 0.1 | 0.5 | 0.2 | 0.4 | 0.3 | 0.2 | 0.4 | . | . | . |
| | 6 | 0.2 | 0.3 | 0.3 | 0.2 | 0.2 | 0.1 | 0.5 | . | . | . |
| | 7 | 0.1 | 0.3 | 0.4 | 0.1 | 0.1 | 0.2 | 0.3 | . | . | . |
| | . | . | . | . | . | . | . | . | . | . | . |
| | . | . | . | . | . | . | . | . | . | . | . |
| | . | . | . | . | . | . | . | . | . | . | . |
| | . | . | . | . | . | . | . | . | . | . | . |
| | . | . | . | . | . | . | . | . | . | . | . |
| | . | . | . | . | . | . | . | . | . | . | . |

DISPLACEMENT DETECTING DEVICE

BACKGROUND OF THE INVENTION

1. Field of the Invention

The present invention relates to displacement detecting devices used in positioning and in detecting a displacement in a linear direction, in a machine tool, an industrial machine, a robot, and the like.

2. Description of the Related Art

Conventionally, a displacement detecting device including a scale and a detection head has been used in order to detect a linear movement amount and a linear position in positioning, in controlling, for position display and the like of a machine tool, an industrial machine, a robot, and the like. Furthermore, in recent years, there has been also proposed a displacement detecting device that detects not only a displacement (movement) of a detection head but also an absolute position of the detection head with respect to a scale by detecting an origin mark through the use of a vernier-type scale.

Examples of such a conventional displacement detecting device include the displacement detecting device described in, for example, Patent Literature 1. The displacement detecting device described in Patent Literature 1 includes a scale having formed therein a first region, in which positional information is recorded at predetermined intervals, and a second region, in which positional information is recorded at intervals different from the intervals of the first region. Furthermore, the displacement detecting device described in Patent Literature 1 (Japanese Laid-Open Patent Publication No. 2004-170153) includes a first reader configured to read positional information in the first region and a second reader configured to read positional information in the second region.

In addition, in the displacement detecting device described in Patent Literature 1, an origin signal is generated when a difference between a first phase detected by reading positional information in the first region and a second phase detected by reading positional information in the second region becomes an arbitrarily set value. With the origin signal used as a reference, the absolute position of the detection head with respect to the scale is detected. Namely, in the displacement detecting device described in Patent Literature 1, the origin mark is arbitrarily formed using a phase difference between the first region and the second region.

SUMMARY OF THE INVENTION

However, in the conventional displacement detecting device described in Japanese Laid-Open Patent Publication No. 2004-170153, the first region is arranged in one of two measurement directions of the scale, and the second region is arranged in the other measurement direction of the scale. Furthermore, when the first reader goes out of the first region or when the second reader goes out of the second region, displacement cannot be detected because the origin mark cannot be formed. As a result, in the displacement detecting device described in Patent Literature 1, the measurement range is restricted to a length in the measurement direction of the first region and the second region.

Furthermore, it is considered that the measurement range is expanded by expanding the interval between the first region and the second region, but there is a problem in which the detection accuracy significantly decreases, at the time or the like when the scale tilts or when the scale expands or shrinks due to a change in temperature.

Moreover, it is considered that the second region is arranged in a direction (orthogonal direction) parallel to the measurement surface of the scale and perpendicular to the measurement direction, with respect to the first region. However, there is also a problem in which the measurement range is restricted when the first reader or second reader moves in the orthogonal direction.

An object of the present invention is to provide a displacement detecting device capable of achieving an enhancement of a measurement range without being restricted by an origin mark or an origin signal.

Solutions to the Problems

According to an aspect of the present invention, a displacement detecting device of the present invention includes a scale, scale marks, a displacement detecting section, a displacement calculation section, a movement detecting section, a movement amount calculation section, a comparison/calculation section, and an absolute position calculation section. The scale marks are provided in the scale, and change so that an integration of pitch intervals between the scale marks along a measurement direction can be approximated by a third or more order polynomial expression and so that an integration of pitch intervals between the scale marks can be approximated by a second or more order polynomial expression along a track direction perpendicular to the measurement direction and parallel to a measurement surface of the scale. The displacement detecting section is arranged facing the measurement surface of the scale and detects a displacement of the scale mark. The displacement calculation section calculates a displacement amount of the scale mark with respect to the scale, based on a displacement of the scale mark detected by the displacement detecting section. The movement detecting section detects a movement in the track direction with respect to the scale in the displacement detecting section. The movement amount calculation section calculates a displacement amount in the track direction with respect to the scale in the displacement detecting section, based on a signal detected by the movement detecting section. When the displacement detecting section or the scale moves in the track direction, the comparison/calculation section differentiates a displacement amount calculated by the displacement calculation section, based on a movement amount in the track direction with respect to the scale calculated by the movement amount calculation section, thereby calculating a second-order differential amount in the track direction. The absolute position calculation section calculates an absolute position in the measurement direction with respect to the scale, based on the second-order differential amount calculated by the comparison/calculation section, and outputs the absolute position.

Effects of the Invention

The displacement detecting device of the present invention is capable of detecting an absolute position in the measurement direction of the scale without depending on an origin mark or an origin signal. Thus, there is no restriction by the origin mark on the measurement direction and on a measurement direction parallel to the measurement surface of the scale and perpendicular to the measurement direction, and thus the measurable range can be expanded. Furthermore, an absolute position in the measurement direction with respect to the scale can be output by one displacement detecting section.

BRIEF DESCRIPTION OF THE DRAWINGS

FIGS. 11A and 11B illustrate the configuration of the displacement detecting section of the displacement detecting device in the second exemplary embodiment of the present invention, in which FIG. 11A is a schematic configuration diagram and FIG. 11B illustrates an operation.

FIG. 18 illustrates an example of a data table stored in a memory of the displacement detecting device in the fifth exemplary embodiment of the present invention.

FIG. 20 illustrates an example of a data table stored in a first memory of the displacement detecting device in the sixth exemplary embodiment of the present invention.

FIG. 21 illustrates an example of a data table stored in a second memory of the displacement detecting device in the sixth exemplary embodiment of the present invention.

FIGS. 22A and 22B illustrate a first modification of the scale of the displacement detecting device in the exemplary embodiment of the present invention, in which FIG. 22A is an enlarged plan view and FIG. 22B is an enlarged cross-sectional view.

FIGS. 23A and 23B illustrate a second modification of the scale of the displacement detecting device in the exemplary embodiment of the present invention, in which FIG. 23A is an enlarged plan view and FIG. 23B is an enlarged cross-sectional view.

FIGS. 24A and 24B illustrate a third modification of the scale of the displacement detecting device in the exemplary embodiment of the present invention, in which FIG. 24A is an enlarged plan view and FIG. 24B is an enlarged cross-sectional view.

FIGS. 25A and 25B illustrate a fourth modification of the scale of the displacement detecting device in the exemplary embodiment of the present invention, in which FIG. 25A is an enlarged plan view and FIG. 25B is an enlarged cross-sectional view.

DESCRIPTION OF THE PREFERRED EMBODIMENTS

Figure 1:
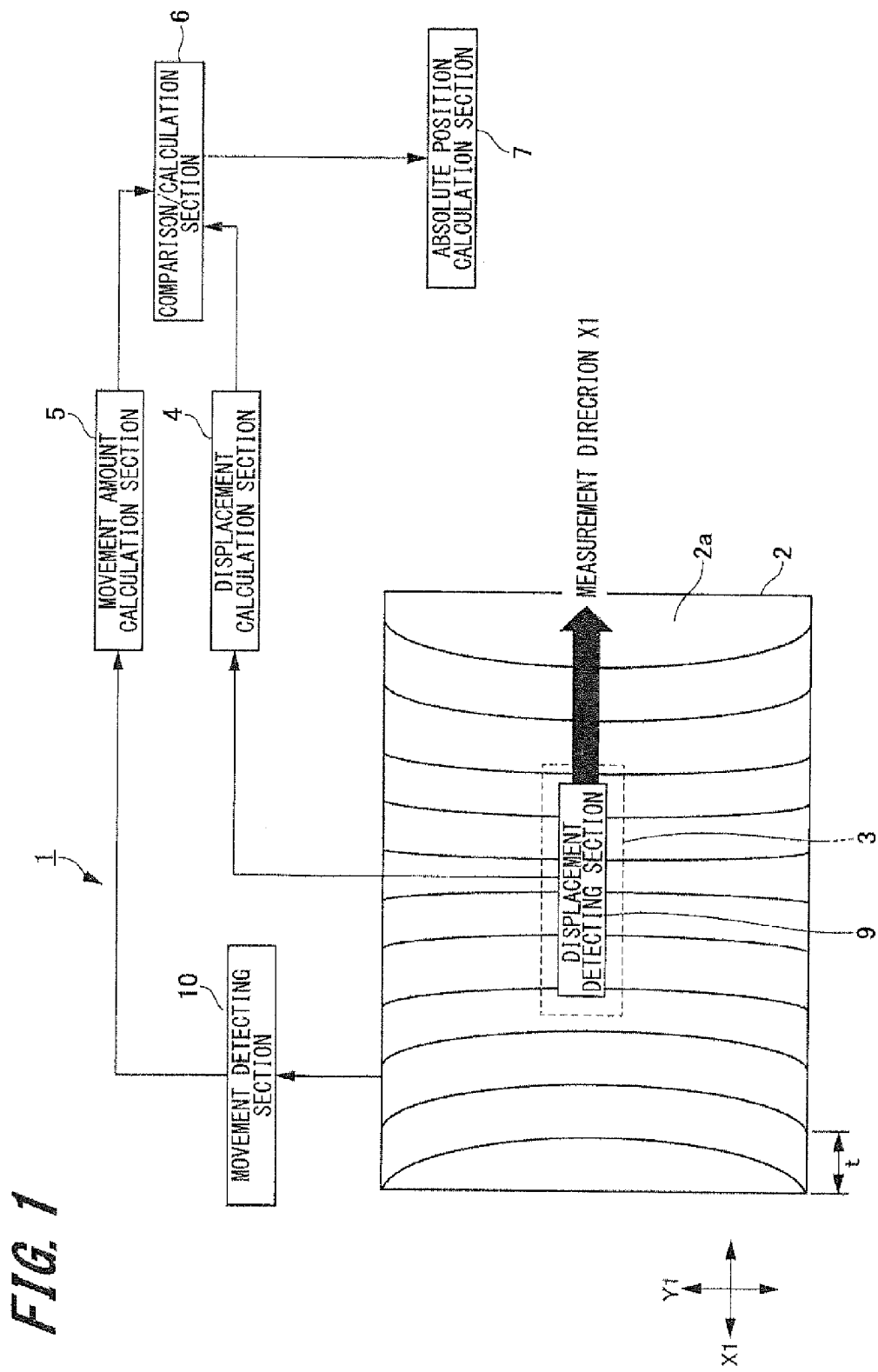
FIG. 1 is a schematic configuration diagram illustrating the configuration of a displacement detecting device in a first exemplary embodiment of the present invention.

Hereinafter, displacement detecting devices of exemplary embodiments of the present invention will be described with reference to FIG. 1 to FIG. 26. Note that the same reference numeral is attached to a member common in each view. In addition, the present invention is not limited to the following embodiments.

First, the configuration of a displacement detecting device in a first exemplary embodiment (hereinafter, referred to as "the example") of the present invention will be described following FIG. 1 to FIG. 3.

FIG. 1 is a schematic configuration diagram illustrating the configuration of the displacement detecting device.

A displacement detecting device 1 of the example is a displacement detecting device that can detect a linear displacement and an absolute position with respect to a scale through the use of a reflective diffraction grating. As illustrated in FIG. 1, the displacement detecting device 1 includes a scale 2, a detection head 3, a displacement detecting section 9, a displacement calculation section 4 connected to the detection head 3, a movement amount calculation section 5, a comparison/calculation section 6, an absolute position calculation section 7, and a movement detecting section 10 connected to the movement amount calculation section 5.

[Scale]

The scale 2 is formed in a substantially flat plate shape. In a measurement surface 2a of the scale 2, the detection head 3 is arranged facing the measurement surface 2a. Furthermore, the scale 2 and the detection head 3 relatively move along the measurement surface 2a of the scale 2. In the example, the detection head 3 moves in a measurement direction X1 of the scale 2 along the measurement surface 2a and in a track direction Y1 perpendicular to the measurement direction X1 and parallel to the measurement surface 2a. Note that, the scale 2 may be moved in the measurement direction X1 along the measurement surface 2a, i.e., the detection head 3 and the scale 2 may relatively move in the measurement direction X1 along the measurement surface 2a. On the measurement surface 2a of the scale 2, a plurality of slits, which are an example of the scale mark, are formed at an interval t along the measurement direction X1. Then, the plurality of slits constitutes a diffraction grating 8 (refer to FIG. 2).

The interval (hereinafter, referred to as the "pitch interval") t between adjacent slits in the diffraction grating 8 continuously changes along the measurement direction X1. A change in the integration of pitch intervals t of the diffraction grating 8 is set so as to be able to be approximated by a third order polynomial expression with respect to the coordinate in the measurement direction X1 in the scale 2 and also approximated by a second-order polynomial expression with respect to the coordinate in the track direction Y1.

Note that, in the example, there has been described an example in which a change in the integration of pitch intervals t of the diffraction grating 8 is expressed by a third order polynomial expression with respect to the coordinate in the measurement direction X1, but the invention is not limited to the above-described example. For example, a change in the pitch interval t of the diffraction grating 8 may be set so as to be approximated by a fourth or more order polynomial expression with respect to the coordinate in the measurement direction X1. Furthermore, there has been described an example in which a change in the pitch interval t of the diffraction grating 8 is expressed by a second-order polynomial expression with respect to the coordinate in the track direction Y1, but the invention is not limited to the above-described example. For example, a change in the pitch interval t of the diffraction grating 8 may be set so as to be approximated by a third or more order polynomial expression with respect to the coordinate in the track direction Y1.

Note that the range of approximation is variously set depending on the measurement accuracy required for the displacement detecting device 1. Namely, when a high accuracy is required for the displacement detecting device 1, an error of a detected absolute position to be described later is preferably within the range of one cycle of the relative positional information detected by the displacement calculation section 4.

[Detection Head]

Figure 2:
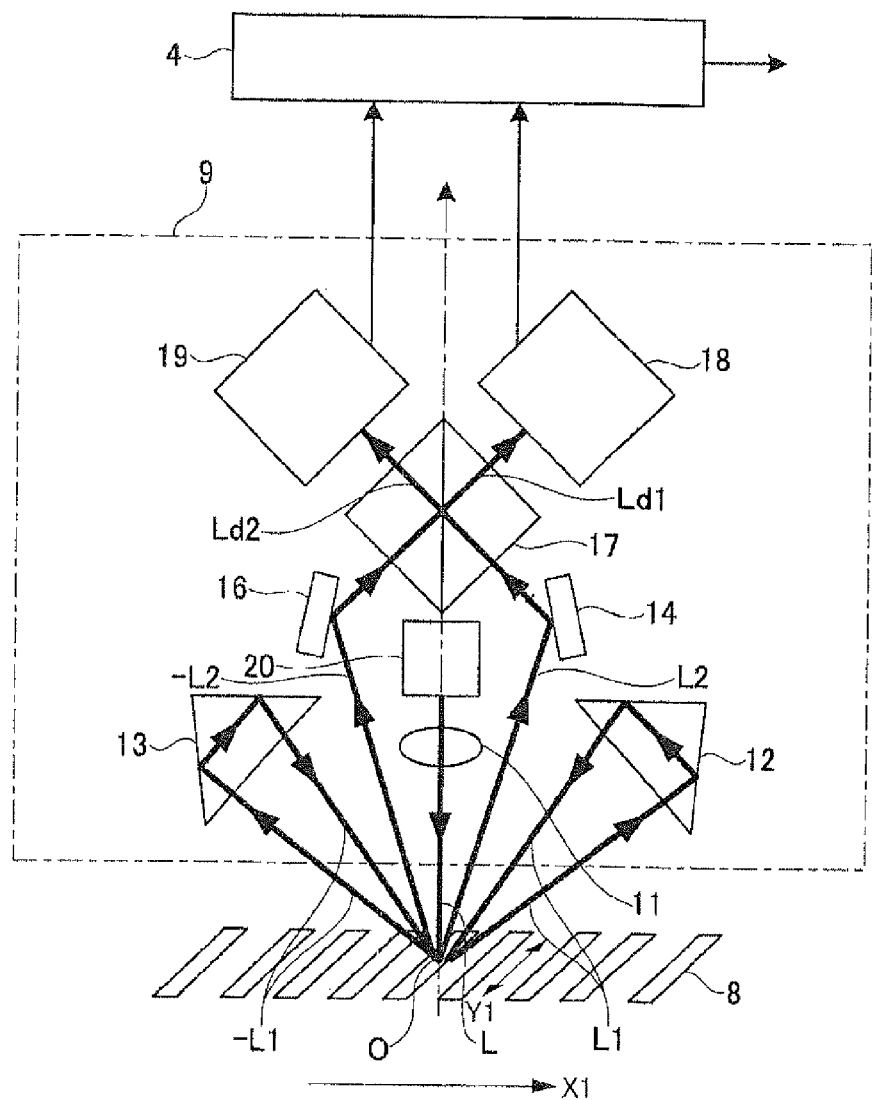
FIG. 2 illustrates the configuration of a displacement detecting section of the displacement detecting device in the first exemplary embodiment of the present invention.

As illustrated in FIG. 1 and FIG. 2, the detection head 3 has a displacement detecting section 9 configured to detect the grid pitch of the diffraction grating 8.

FIG. 2 is a schematic configuration diagram illustrating the configuration of the displacement detecting section 9.

As illustrated in FIG. 2, the displacement detecting section 9 has a light source 20, a lens 11, a first reflection section 12, a second reflection section 13, a first mirror 14, a second mirror 16, a beam splitter 17, a first light-receiving section 18, and a second light-receiving section 19.

The light source 20 is arranged substantially perpendicular to the measurement surface 2a of the scale 2. A coherent light source is preferable as the light source 20, and the examples of the coherent light source include a gas laser, a semiconductor laser diode, a super luminescence diode, a light emitting diode, and the like.

Note that, in the example, there has been described an example in which the light source 20 is arranged inside the displacement detecting section 9, but the invention is not limited to the above-described example. For example, the light source 20 may have a configuration in which light is supplied from a light source provided outside the displacement detecting section 9, through an optical fiber. In addition, the maintenance of the light source at a place away from the displacement detecting device 1 becomes possible by further making the light source detachable and the operability can be improved.

Furthermore, a lens 11 is arranged between the light source 20 and the scale 2. The lens 11 converges light L emitted from the light source 20 into light with an arbitrary diameter. An achromatized lens may be used as the lens 11, depending on a wavelength region to be used. A variation in focal length of the lens 11 can be less affected by a variation in wavelength of the light source 20 by subjecting the lens 11 to achromatization. As a result, more stable displacement measurement can be performed.

The light L emitted from the light source 20 is emitted by an arbitrary spot O of the diffraction grating 8 of the scale 2 through the lens 11.

The light L with which the diffraction grating 8 has been irradiated is subjected to the first-time diffraction (reflection) by the diffraction grating 8. Therefore, the light L with which the diffraction grating 8 has been irradiated is divided, by the diffraction grating 8, into diffracted light (hereinafter, referred to as "first diffracted light") L1 having been subjected to the first-time diffraction and having a positive order, and one-time diffracted light −L1 having a negative order.

The first reflection section 12 and the second reflection section 13 are arranged along a first measurement direction X1 so as to sandwich the light source 20 therebetween. The first reflection section 12 and the second reflection section 13 are each constituted of, for example, a prism or a plurality of mirrors.

The one-time diffracted light L1 having been diffracted once by the diffraction grating 8 and having a positive order is incident upon the first reflection section 12, whereas the one-time diffracted light −L1 having been diffracted once by the diffraction grating 8 and having a negative order is incident upon the second reflection section 13. The first reflection section 12 reflects the incident one-time diffracted light L1 twice inside the first reflection section 12 and enters again the spot O of the diffraction grating 8. Furthermore, the second reflection section 13 reflects the incident one-time diffracted light −L1 twice inside the second reflection section 13 and enters again the spot O of the diffraction grating 8.

Note that, in the example, there has been described an example in which a prism is used as the first reflection section 12 and second reflection section 13, respectively, to thereby reflect the one-time diffracted light L1 and the one-time diffracted light −L1 twice inside the respective reflection sections, but the invention is not limited to the above-described example. For example, one mirror may be used as the first reflection section 12 and second reflection section 13, respectively, to thereby reflect the incident one-time diffracted light L1 and the incident one-time diffracted light −L1 once and return again the resulting diffracted light L1 and diffracted light −L1 to the diffraction grating 8.

The one-time diffracted light L1 having a positive order and having been incident again upon the diffraction grating 8 by the first reflection section 12 is subjected to the second-time diffraction by the diffraction grating 8, and is emitted from the diffraction grating 8 as diffracted light (hereinafter, referred to as "two-time diffracted light") L2 having a positive order and having been subjected to the second-time diffraction. In addition, the one-time diffracted light −L1 having a negative order and having been incident again upon the diffraction grating 8 by the second reflection section 13 is subjected to the second-time diffraction by the diffraction grating 8 and is emitted from the diffraction grating 8 as two-time diffracted light −L2 having a negative order.

The first mirror 14 and the second mirror 16 are arranged along the measurement direction X1 so as to sandwich the light source therebetween. The two-time diffracted light L2 having a positive order is incident upon the first mirror 14, whereas the two-time diffracted light −L2 having a negative order is incident upon the second mirror 16. Then, the first mirror 14 reflects the incident two-time diffracted light L2 to the beam splitter 17, and the second mirror 16 reflects the incident two-time diffracted light-L2 to the beam splitter 17.

The beam splitter 17 is arranged above the light source 20 opposite the diffraction grating 8. The beam splitter 17 obtains interference light by superposing the two-time diffracted light L2 reflected by the first mirror 14 and the two-time diffracted light −L2 reflected by the second mirror 16. Furthermore, the beam splitter 17 divides the interference light into first interference light Ld1 and second interference light Ld2 and emits the first interference light Ld1 and second interference light Ld2. The first light-receiving section 18 is provided at an emission port of the first interference light Ld1 in the beam splitter 17, whereas the second light-receiving section 19 is provided at an emission port of the second interference light Ld2 in the beam splitter 17.

The first light-receiving section 18 and the second light-receiving section 19 in the displacement detecting section 9 are connected to the displacement calculation section 4.

The first light-receiving section 18 receives the interference light Ld and subjects the same to photoelectric conversion to obtain an interference signal of A cos (4KΔx+δ), where A is the amplitude of the interference, K is a wave number represented by 2π/t, furthermore, Δx represents a movement amount in the measurement direction X1 of the detection head 3, and δ represents an initial phase.

Here, the displacement detecting section 9 of the displacement detecting device 1 of the example divides the light L emitted from the light source 20 into the one-time diffracted light L1 having a positive order and the one-time diffracted light −L1 having a negative order by the diffraction grating 8. Furthermore, the diffraction grating 8 diffracts the light twice (2K), and the beam splitter 17 superposes two diffraction lights L2 and −L2 having been diffracted twice (2K+2K=4K). Therefore, the movement amount x is multiplied by 4K as with the above-described interference signal.

Accordingly, the diffraction grating 8 and the displacement detecting section 9 relatively move in the measurement direction X1 and thus the first light-receiving section 18 can obtain four waves, i.e., four times of light brightness and darkness, per one pitch (1t) of the diffraction grating 8. Thereby, displacement detection with a high resolution becomes possible.

Note that the phase of a signal obtained by the second light-receiving section 19 differs by 90 degrees from the interference signal obtained by the first light-receiving section 18. Therefore, a sine signal and a cosine signal can be obtained. Then, the sine signal and cosine signal are output to the displacement calculation section 4.

[Movement Detecting Section]

The movement detecting section 10 is connected to the scale 2, and detects a change in movement in the track direction Y1 in the scale 2. The movement detecting section 10 is an external detection device. For example, a magnetic-type or electrostatic capacitance-type detection device or various other types of detection devices such as a laser interferometer can be used as the movement detecting section 10. The movement detecting section 10 is connected to the movement amount calculation section 5. The movement amount calculation section 5 calculates a movement amount in the track direction of the scale 2, based on a signal obtained by the movement detecting section 10.

An example of a length measurement device has been given as the movement detecting section 10, but the invention is not limited to the above-described example. The movement detecting section 10 may be, for example, a count value of a stepping motor or the number of pulses of a linear motor mounted for driving the scale 2, image data of a fixed point camera, or the like.

[Displacement Calculation Section]

The displacement calculation section 4 converts a signal sent from the displacement detecting section 9 to a digital signal and interpolates the digital signal, to thereby convert the same to incremental information. Then, the displacement calculation section 4 counts the number of pulses of the incremental information by using a non-illustrated counter, thereby measuring how many cycles the intensity of the interference light varied. Thus, the displacement calculation section 4 calculates a displacement amount in the displacement detecting section 9.

As described above, a change in the integration of pitch intervals t of the diffraction grating 8 is set so as to be able to be approximated by a third order polynomial expression with respect to the coordinate in the measurement direction X1 in the scale 2 and is also set so as to be able to be approximated by a second-order polynomial expression with respect to a coordinate in the track direction Y1 in the scale 2. Therefore, an output value (displacement amount) fx(x,y) in the displacement calculation section 4 when the detection head 3 is moved in the measurement direction X1 can be expressed by Formula 1 below.

$$fx(x,y)=A+Bx+Cx^2+Dx^3+Exy+Fy^2,$$ [Formula 1]

where x represents a coordinate in the measurement direction X1, y represents a coordinate in the track direction Y1, and A, B, C, D, E, and F each represent a coefficient of Formula 1.

Furthermore, an output value (displacement amount) fy(x, y) in the displacement calculation section 4 when the detection head 3 is moved in the track direction Y1 can be expressed by Formula 2 below.

$$fy(x,y)=G+Hy+Iy^2+Jxy+Kxy^2,$$ [Formula 2]

where G, H, I, J, and K each represent a coefficient of Formula 2.

[Comparison/Calculation Section]

The displacement calculation section 4 and movement amount calculation section 5 are connected to the comparison/calculation section 6 and the absolute position calculation section 7. A displacement amount with respect to the scale 2 in the detection head 3 is output to the comparison/calculation section 6 from the displacement calculation section 4, and a movement amount in the track direction Y1 in the detection head 3 is output to the comparison/calculation section 6 from the movement amount calculation section 5. The comparison/calculation section 6 compares and calculates the information output from the displacement calculation section 4 and the information output from the movement amount calculation section 5.

[Absolute Position Calculation Section]

The comparison/calculation section 6 is connected to the absolute position calculation section 7. Then, the absolute position calculation section 7 calculates and outputs an absolute position in the measurement direction X1 of the detection head 3 with respect to the scale 2 based on information calculated by the comparison/calculation section 6.

[Method for Manufacturing Diffraction Grating]

Next, a method for manufacturing the diffraction grating 8 will be described with reference to FIG. 3.

Figure 3:
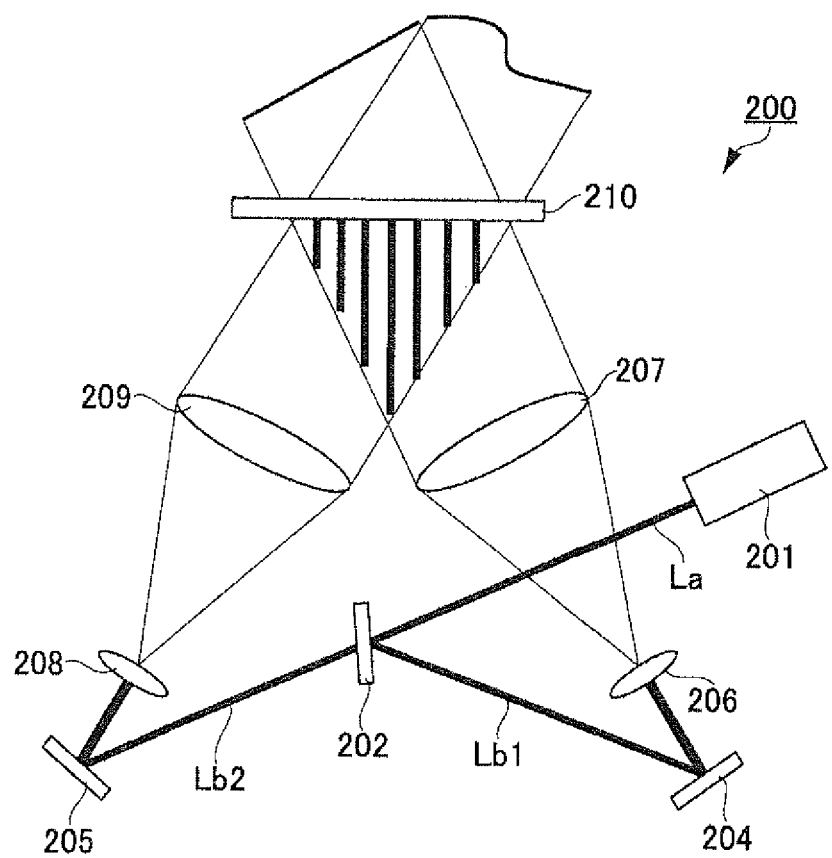
FIG. 3 is an explanatory view illustrating a method for manufacturing a scale of the displacement detecting device in the first exemplary embodiment of the present invention.

The diffraction grating 8 of the example is manufactured using, for example, an exposure apparatus 200 illustrated in FIG. 3. The exposure apparatus 200 is an apparatus that exposes an interference pattern onto the surface of a photosensitive material (hereinafter, referred to as a "photosensitive material") by interference exposure using two light fluxes. Then, the interference pattern exposed on the surface of the photosensitive material 210 serves as the diffraction grating 8.

As illustrated in FIG. 3, the exposure apparatus 200 is constituted of a light source 201 that is a coherent light source, a distributor 202, a first mirror 204, a second mirror 205, a first lens 206, a second lens 207, a third lens 208, and a fourth lens 209.

The examples of the light source 201 include a laser diode, a super luminescence diode, a gas laser, a solid state laser, a light emitting diode, and the like, as a coherent light source.

Light flux La emitted from the light source 201 is divided by the distributor 202 into first light flux Lb1 and second light flux Lb2. The first light flux Lb1 is incident upon the first mirror 204, whereas the second light flux Lb2 is incident upon the second mirror 205.

The first lens 206 and the second lens 207 are arranged between the first mirror 204 and the scale 2. Furthermore, the third lens 208 and the fourth lens 209 are arranged between the second mirror 205 and the scale 2.

The first light flux Lb1 incident upon the first mirror 204 is reflected by the first mirror 204, and is then incident upon the surface of the photosensitive material 210 via the first lens 206 and second lens 207. In addition, the second light flux Lb2 incident upon the second mirror 205 is reflected by the second mirror 205, and is then incident upon the surface of the photosensitive material 210 via the third lens 208 and fourth lens 209.

Note that, the first light flux Lb1 is converted into a plane wave whose wave surface is flat, by the first lens 206 and second lens 207, and is incident upon the photosensitive material 210. Furthermore, the second light flux Lb2 is converted to a plane wave, whose wave surface has a predetermined aberration with respect to the wave surface of the first light flux Lb1, by the third lens 208 and fourth lens 209, and is incident upon the photosensitive material 210. The first light flux Lb1 and the second light flux Lb2 are superposed to form an interference fringe pattern having a desired period on the surface of the photosensitive material 210. Then, the surface of the photosensitive material 210 is exposed along the interference fringe pattern to form the diffraction grating 8.

Note that, in the exposure apparatus 200 illustrated in FIG. 3, there has been described an example in which the wave surface of the plane wave of the second light flux Lb2 has aberration, but the invention is not limited to the above-described example. Both the wave surface of the plane wave of the first light flux Lb1 and the wave surface of the plane wave of the second light flux Lb2 may have a predetermined aberration.

Furthermore, the method for forming the diffraction grating 8 is not limited to the above-described method using the exposure apparatus 200. For example, slits may be formed one by one on the surface of the photosensitive material 210 by narrowing a laser beam, or various other kinds of methods may be used.

Figure 4:
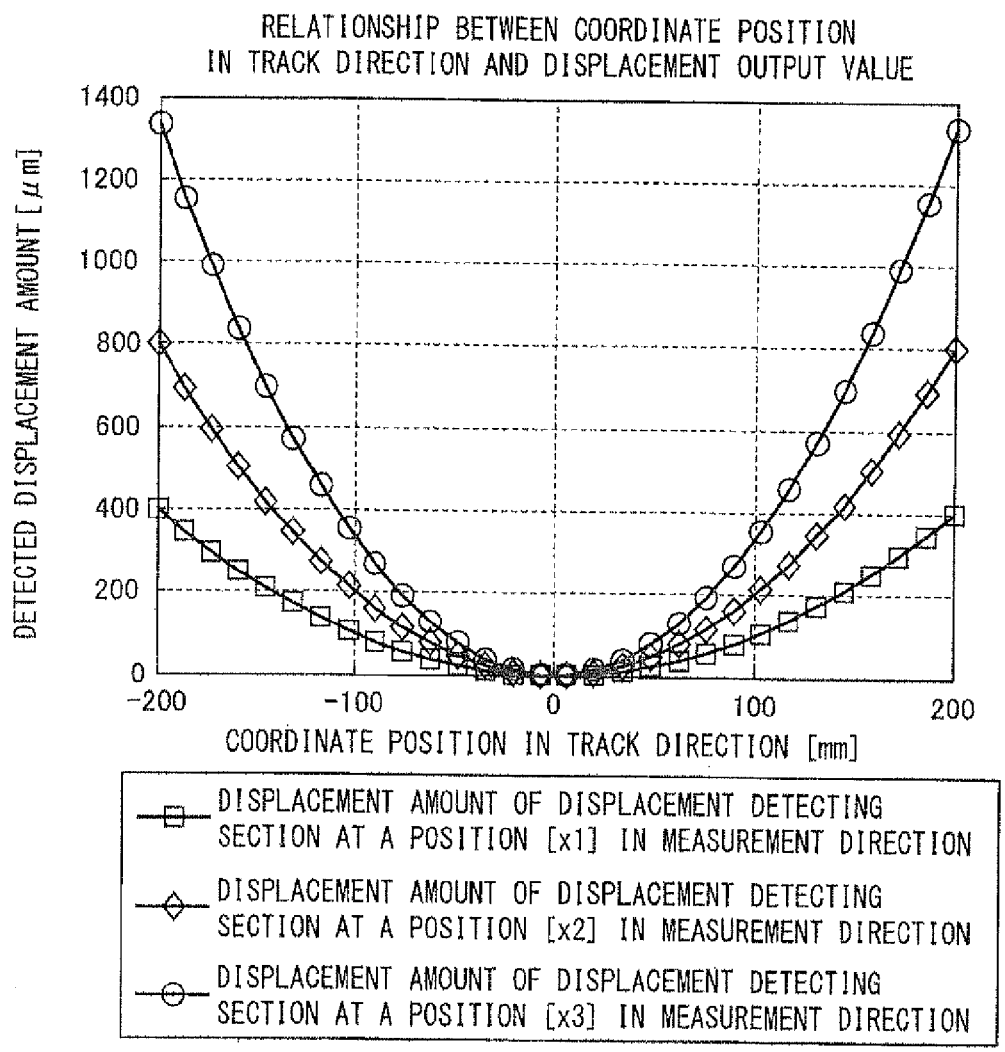
FIG. 4 is a graph illustrating a relationship between a displacement in a track direction and an output value of the displacement detecting device in the first exemplary embodiment of the present invention.

Next, a detection operation of detecting an absolute position using the displacement detecting device of the example will be described with reference to FIG. 1, FIG. 2, and FIG. 4 to FIG. 6. FIG. 4 is a graph illustrating a relationship between a displacement amount calculated by the displacement calculation section 4 and a coordinate position in the track direction Y1.

First, as illustrated in FIG. 1 and FIG. 2, the scale 2 is first moved by a predetermined distance along the track direction Y1 by a drive unit provided outside. Note that an example of moving the scale 2 has been describe, but the detection head 3 may be moved in the tack direction Y1 with respect to the scale 2. In that case, the movement detecting section 10 is connected to the detection head 3.

Then, the detection head 3 outputs a Lissajous signal including a sine signal and a cosine signal to the displacement calculation section 4 by using the displacement detecting section 9. Next, the displacement calculation section 4 calculates a displacement amount, based on the sent signal. Then, the displacement calculation section 4 outputs the calculated a displacement amount to the comparison/calculation section 6.

Furthermore, the movement detecting section 10 detects a movement amount in the track direction Y1 in the scale 2, and outputs the detected signal to the movement amount calculation section 5. Then, the movement amount calculation section 5 calculates a movement amount in the track direction Y1 with respect to the scale 2 in the detection head 3 based on the signal from the movement detecting section 10. Next, the movement amount calculation section 5 outputs the calculated a movement amount in the track direction Y1 with respect to the scale 2 in the detection head 3, to the comparison/calculation section 6.

Here, as illustrated in Formula 2 and FIG. 4, a displacement amount calculated by the displacement calculation section 4 changes, in a second-order approximate expression, with respect to the coordinate position in the track direction Y1. Furthermore, the relationship between a displacement amount calculated by the displacement calculation section 4, and a coordinate position in the track direction Y1 changes with respect to given positions (x1, x2, x3) in the measurement direction X1 of the detection head 3 with respect to the scale 2.

Figure 5:
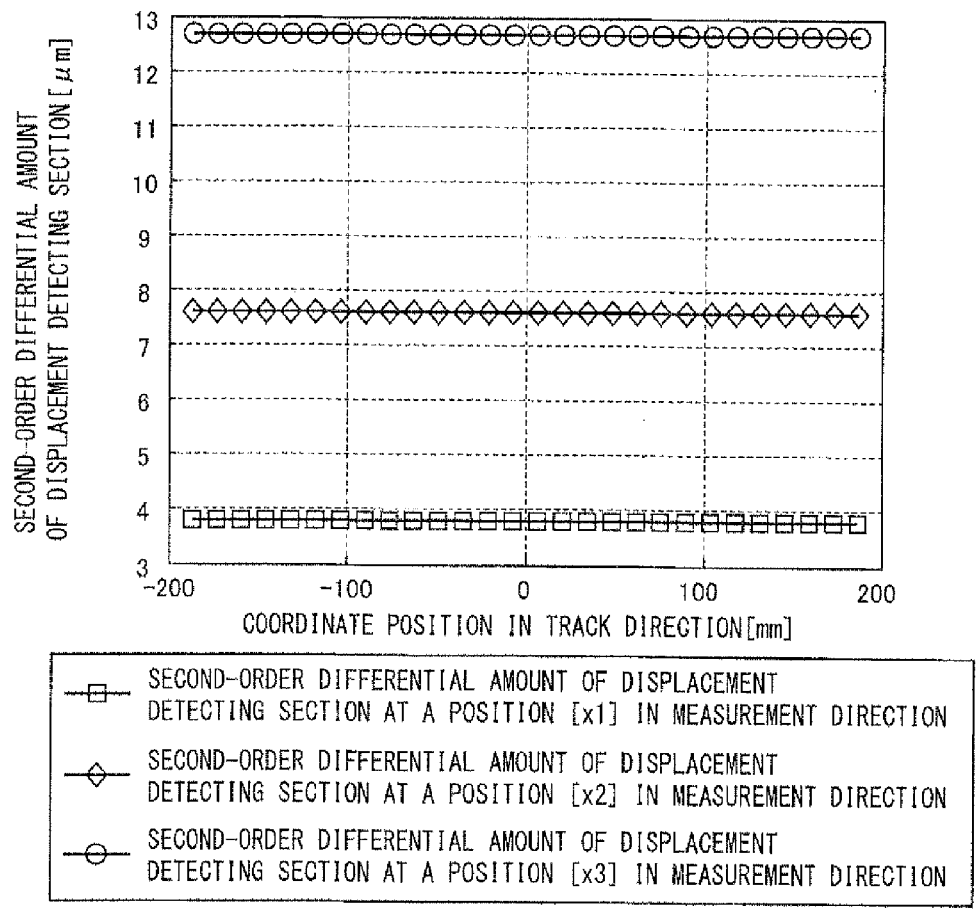
FIG. 5 is a graph illustrating a relationship between a displacement in the track direction and a second-order differential amount of a displacement detecting section of the displacement detecting device in the first exemplary embodiment of the present invention.

FIG. 5 is a graph illustrating a relationship between a coordinate position in the track direction Y1 and a second-order differential amount of the displacement amount calculated by the displacement calculation section 4.

As illustrated in FIG. 5, the second-order differential amount in the track direction Y1 in the displacement amount calculated by the displacement calculation section 4 changes for each of the given positions (x1, x2, x3) in the measurement direction X1 of the detection head 3 with respect to the scale 2.

The comparison/calculation section 6 calculates a second-order differential amount of the information input from the displacement calculation section 4, based on the information input from the movement amount calculation section 5. Next, the comparison/calculation section 6 outputs the calculated second-order differential amount to the absolute position calculation section 7.

Figure 6:
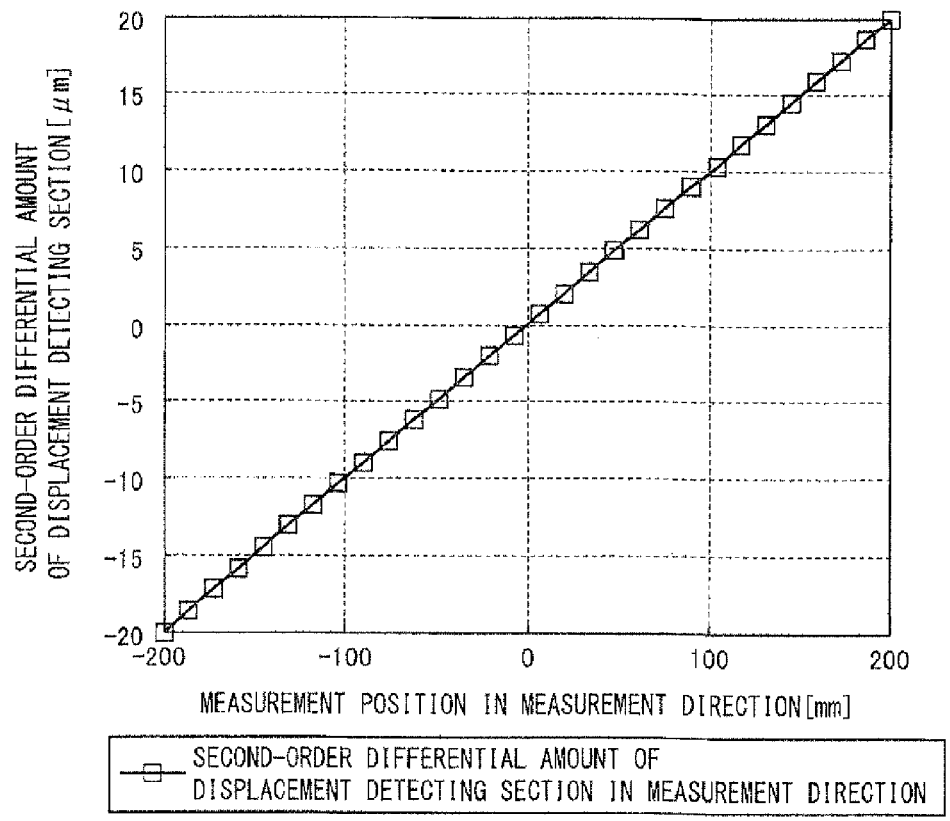
FIG. 6 is a graph illustrating a relationship between a displacement in a measurement direction and a second-order differential amount of the displacement detecting section of the displacement detecting device in the first exemplary embodiment of the present invention.

FIG. 6 is a graph illustrating a relationship between a measurement position in the measurement direction X1 and a second-order differential amount of the displacement detecting section.

As illustrated in FIG. 6, the second-order differential amount of a displacement amount of the displacement detecting section 9 when the detection head 3 moves in the track direction Y1 can be expressed by a linear function proportional to the measurement position (coordinate) in the measurement direction X1. Therefore, a measurement position in the measurement direction X1 is uniquely determined by the second-order differential amount.

Furthermore, information indicative of a relationship between a second-order differential amount and a measurement position of the scale 2 is stored in the absolute position calculation section 7 in advance. Accordingly, the absolute position calculation section 7 calculates an absolute position in the measurement direction X1 of the scale 2 in the detection head 3, based on the second-order differential amount calculated by the comparison/calculation section 6, and outputs the absolute position. Therefore, the detection operation of detecting an absolute position in the measurement direction X1 in the detection head 3 using the displacement detecting device 1 of the example is completed.

The displacement detecting device 1 of the example can detect an absolute position in the measurement direction X1 with respect to the scale 2 without depending on an origin signal or an origin mark. Furthermore, because an absolute position can be detected by one displacement detecting section 9, the number of components of the displacement detecting device 1 can be reduced and a reduction in size of the displacement detecting device 1 can be also achieved.

Next, a relationship between incremental information and absolute positional information will be described with reference to FIG. 7.

Figure 7:
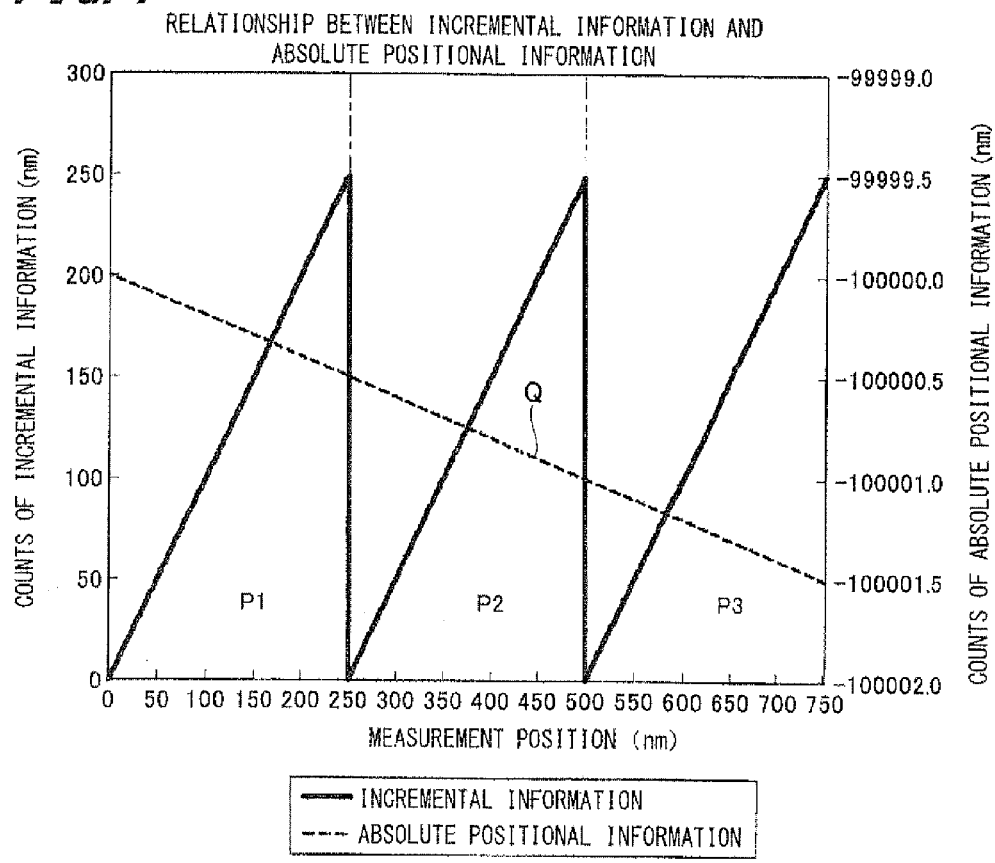
FIG. 7 is a graph illustrating a relationship between incremental information and absolute positional information of the displacement detecting device in the first exemplary embodiment of the present invention.

FIG. 7 is a graph illustrating a relationship between incremental information and absolute positional information.

As illustrated in FIG. 7, the period of the interference signal of light is ¼ of the pitch interval t, and thus one period of the incremental information is approximately 250 nm. Here, the displacement calculation section 4 performs A/D conversion of a periodic signal, divides the resulting digital signal by a division number 2500, for example, and calculates with a resolution of 0.1 nm. Therefore, the displacement calculation section 4 of the example has one period of incremental information, i.e., information about the absolute position with the resolution of 0.1 nm if one period is 250 nm. Then, the displacement calculation section 4 calculates relative positional information by successively summing the information.

However, in the case or the like where the power supply has been turned off or where a foreign matter has adhered to the diffraction grating 8, there is a problem in which the original position cannot be recognized once the summation of signals is interrupted. In contrast, in the example, the detection head 3 is moved in the track direction Y1 and an absolute position in the measurement direction X1 of the detection head 3 with respect to the scale 2 is calculated.

Furthermore, the absolute position calculation section 7 may attach an address such as the first address P1, the second address P2, or the third address P3 for one period of the incremental information, based on the calculated absolute positional information. Then, the absolute position calculation section 7 determines which address of the incremental information the current position is at, based on the calculated absolute positional information. For example, as illustrated in FIG. 7, when the absolute positional information is Q, it is found that the current position is within one period of the second address P2 of the incremental information.

Note that, as described above, the pitch interval t of the diffraction grating 8 continuously changes along the measurement direction X1. Therefore, the length of one period of incremental information also changes. However, since a position in the measurement direction X1 with respect to the diffraction grating 8 is known from the calculated absolute positional information, an amount of modification of the pitch interval t is also known. Therefore, the absolute position calculation section 7 may correct the length of one period of incremental information in accordance with an amount of modification of the pitch interval t.

Note that the absolute position calculation section 7 may set the calculated absolute positional information as higher-digit displacement information of the absolute value to be output and set the incremental information about the relative positional information as lower-digit displacement information of the absolute value to be output. Here, the higher digit includes, for example, at least the most significant digit.

Next, a first modification of the displacement detecting section will be described with reference to FIG. 8.

Figure 8:
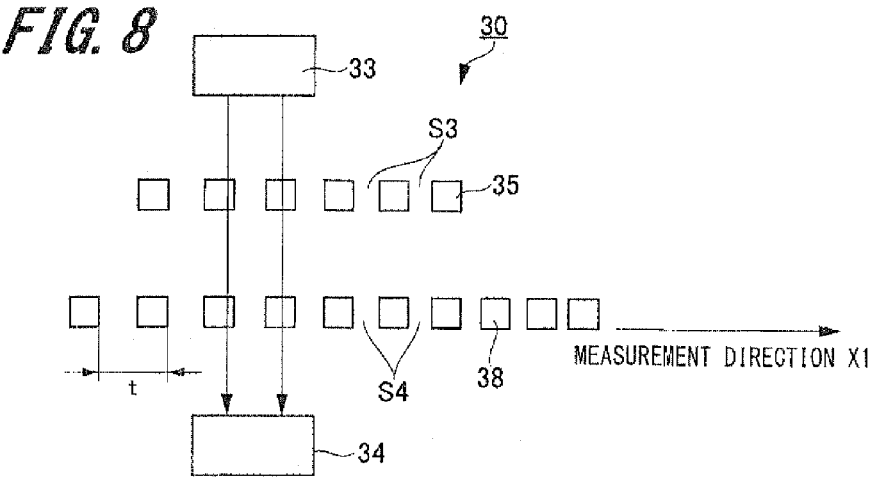
FIG. 8 is a schematic configuration diagram illustrating a first modification of the displacement detecting section of the displacement detecting device in the first exemplary embodiment of the present invention.

FIG. 8 is a schematic configuration diagram illustrating the first modification of the displacement detecting section.

In the displacement detecting device 1 according to the above-described first exemplary embodiment, there has been described an example in which a displacement detecting section using diffraction of the diffraction grating 8 as illustrated in FIG. 3 is used as the displacement detecting section, but the invention is not limited to the above-described example. For example, a moire-type displacement detecting section 30 illustrated in FIG. 8 may be applied, or various other types of displacement detecting sections may be applied.

The displacement detecting section 30 illustrated in FIG. 8 includes a light source 33 provided in a non-illustrated detection head, a light-receiving section 34 that receives light emitted from the light source 33, a main scale 35 interposed between the light source 33 and the light-receiving section 34, and a sub-scale 38.

The main scale 35 is mounted on a non-illustrated detection head together with the light source 33. A plurality of slits S3 each formed at a predetermined pitch interval is provided in the main scale 35. A plurality of slits S3 extends in a direction that is parallel to one surface irradiated with the light source 33 in the main scale 35 and that is also perpendicular to the measurement direction X1. The light emitted from the light source 33 passes through a plurality of slits S3 and is incident upon the sub-scale 38.

The sub-scale 38 is arranged on the light-receiving section 34 side of the main scale 35. A plurality of slits S4 is provided in the sub-scale 38. The slits S4 extend in a direction that is parallel to one surface irradiated with the light source 33 in the main scale 35 and that is also perpendicular to the measurement direction X1. The interval t of the slits S4 in the sub-scale 38 continuously changes along the measurement direction X1 and track direction Y1 as with the diffraction grating 8 of the first exemplary embodiment. Furthermore, a change in the integration of pitch intervals t is set in a third or more order polynomial expression with respect to the coordinate in the measurement direction X1 in the sub-scale 38 and in a second or more order polynomial expression with respect to the coordinate in the track direction Y1. Furthermore, the light having been emitted from the light source 33 and having passed through the main scale 35 passes through a plurality of slits S4 and is incident upon the light-receiving section 34.

The main scale 35 and sub-scale 38 are relatively movably supported along the measurement direction X1 by a non-illustrated support member.

The light having been emitted from the light source 33 and having passed through the main scale 35 and sub-scale 38 is incident upon the light-receiving section 34. Then, the light-receiving section 34 detects the pitch of the sub-scale 38 by receiving an interference pattern that is formed when the light passes through the main scale 35 and sub-scale 38.

An operational effect similar to the above-described displacement detecting device 1 according to the first exemplary embodiment can be obtained even using the displacement detecting section 30 according to the first modification.

Next, a second modification of the displacement detecting section will be described with reference to FIG. 9

Figure 9:
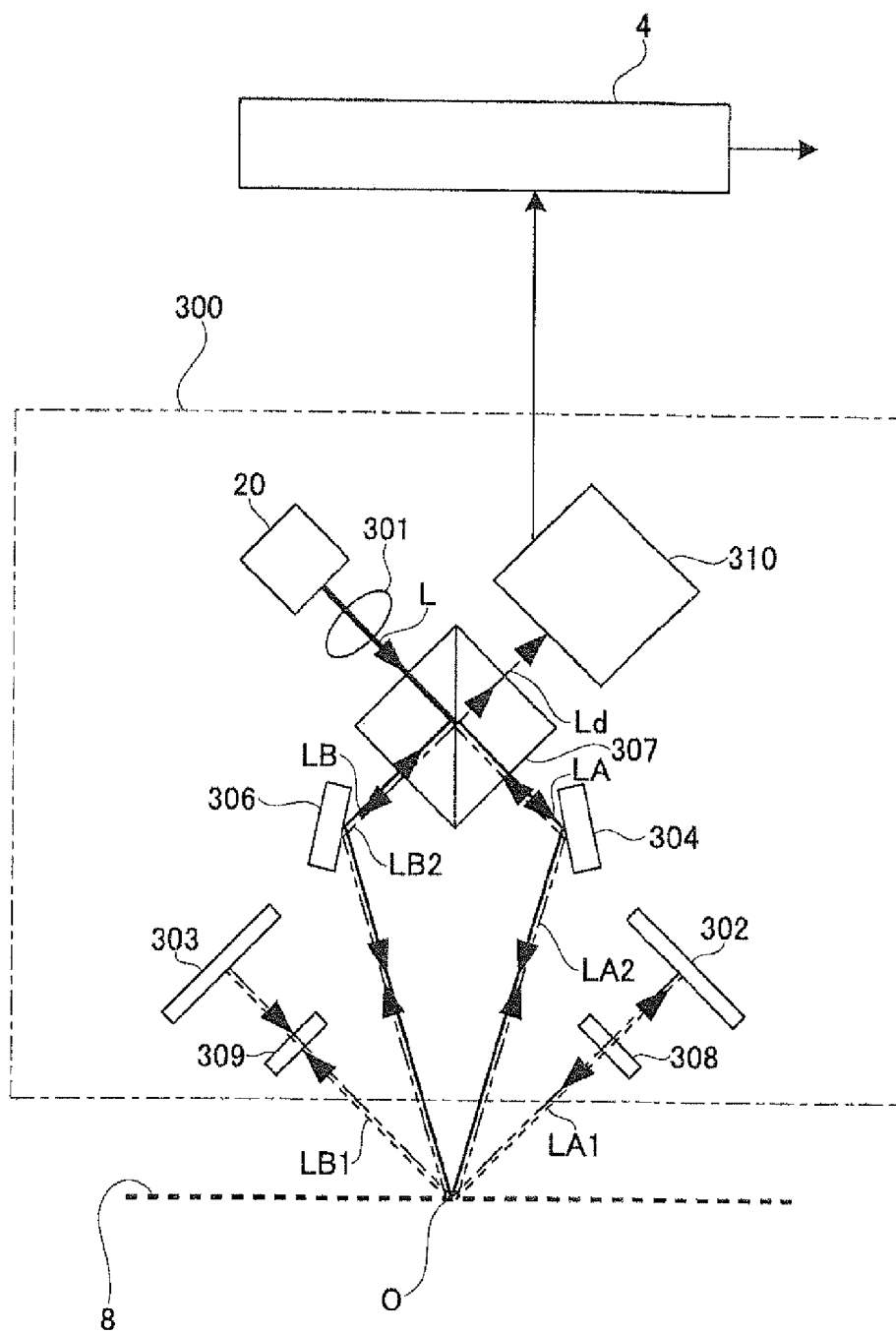
FIG. 9 is a schematic configuration diagram illustrating a second modification of the displacement detecting section of the displacement detecting device in the first exemplary embodiment of the present invention.

FIG. 9 is a schematic configuration diagram illustrating the second modification of the displacement detecting section.

In the displacement detecting section 9 of the displacement detecting device 1 according to the above-described first exemplary embodiment, there has been described an example in which the light L emitted from the light source 20 is divided, by the diffraction grating 8, into the one-time diffracted light L1 having a positive order and the one-time diffracted light −L1 having a negative order, but the invention is not limited to the above-described example. For example, as illustrated in FIG. 9, there may be applied a displacement detecting section 300 which divides, by a beam splitter, the light L emitted from the light source 20 into light LA and light LB. Note that the same reference numeral is attached to a portion common to the displacement detecting section 9 of the displacement detecting device 1 according to the first exemplary embodiment and the duplicated description is omitted.

The displacement detecting section 300 illustrated in FIG. 9 includes the light source 20, a lens 301, a first reflection section 302, a second reflection section 303, a first mirror 304, a second mirror 306, a beam splitter 307, a first wavelength plate 308, a second wavelength plate 309, and a light-receiving section 310.

The light L emitted from the light source 20 is incident upon the lens 301. The lens 301 converges the incident light L into light with an arbitrary diameter. Note that the lens 301 has the same configuration as the lens 11 of the displacement detecting section 9 illustrated in FIG. 2. The beam splitter 307 is arranged on the emission side of the lens 301. The light L converged by the lens 301 is incident upon the beam splitter 307.

The beam splitter 307 divides the light L into first light LA and second light LB. The first mirror 304 is arranged on the side of the beam splitter 307 in which the first light LA is emitted, whereas the second mirror 306 is arranged on the side of the beam splitter 307 in which the second light LB is emitted. Then, the first mirror 304 reflects the first light LA emitted from the beam splitter 307 toward the spot O of the diffraction grating 8. Furthermore, the second mirror 306 reflects the second light LB emitted from the beam splitter 307 toward the spot O of the diffraction grating 8.

The first light LA and second light LB with which the diffraction grating 8 has been irradiated are subjected to the first-time diffraction (reflection) by the diffraction grating 8. Therefore, the first light LA with which the diffraction grating 8 has been irradiated is subjected to the first-time diffraction by the diffraction grating 8, resulting in serving as a first one-time diffracted light LA1. Furthermore, the second light LB with which the diffraction grating 8 has been irradiated is subjected to the first-time diffraction by the diffraction grating 8, resulting in serving as a second one-time diffracted light LB1.

The first reflection section 302 and second reflection section 303 are arranged so as to sandwich the beam splitter 307 therebetween. Furthermore, the first wavelength plate 308 is arranged between the first reflection section 302 and the diffraction grating 8, whereas the second wavelength plate 309 is arranged between the second reflection section 303 and the diffraction grating 8. The first wavelength plate 308 and second wavelength plate 309 are respectively constituted of a ¼ wavelength plate.

The first one-time diffracted light LA1 having been reflected and diffracted by the diffraction grating 8 passes through the first wavelength plate 308 and is incident upon the first reflection section 302. The first reflection section 302 reflects again the incident first one-time diffracted light LA1 toward the spot O of the diffraction grating 8. At this time, an optical path, along which the first one-time diffracted light LA1 is incident upon the first reflection section 302 from the diffraction grating 8 and an optical path, along which the first one-time diffracted light LA1 is reflected from the first reflection section 302 to the diffraction grating 8, overlap with each other.

Additionally, the second one-time diffracted light LB1 having been reflected and diffracted by diffraction grating 8 passes through the second wavelength plate 309 and is incident upon the second reflection section 303. The second reflection section 303 reflects again the incident second one-time diffracted light LB1 toward the spot O of the diffraction grating 8. At this time, an optical path, along which the second one-time diffracted light LB1 is incident upon the second reflection section 303 from the diffraction grating 8, and an optical path, along which the second one-time diffracted light LB1 is reflected from the second reflection section 303 to the diffraction grating 8, overlap with each other.

Furthermore, a lens may be provided on an optical path between the first reflection section 302 and the diffraction grating 8 or on an optical path between the second reflection section 303 and the diffraction grating 8.

Note that, also in the displacement detecting section 300 according to the second modification, as with the above-described displacement detecting sections 9 and 10 illustrated in FIG. 3, the optical path, along which the light is incident upon the first reflection section 302 or second reflection section 303 from the diffraction grating 8, and the optical path, along which the light is reflected from the first reflection section 302 or second reflection section 303 to the diffraction grating 8, may not overlap with each other. Namely, the first reflection section 302 and second reflection section 303 may be constituted of, for example, a prism or a plurality of mirrors to thereby reflect the first one-time diffracted light LA1 and second one-time diffracted light LB1 multiple times by the first reflection section 302 and second reflection section 303.

The incident first one-time diffracted light LA1, which has been incident again upon the diffraction grating 8 by the first reflection section 302, is subjected to the second-time diffraction by the diffraction grating 8, and is emitted from the diffraction grating 8 as the first two-time diffracted light LA2. In addition, the incident second one-time diffracted light LB1, which has been incident again upon the diffraction grating 8 by the second reflection section 303, is subjected to the second-time diffraction by the diffraction grating 8, and is emitted from the diffraction grating 8 as the second two-time diffracted light LB2.

The first two-time diffracted light LA2 is reflected by the first mirror 304 and is incident upon the beam splitter 307. The second two-time diffracted light LB2 is reflected by the second mirror 306 and is incident upon the beam splitter 307. The beam splitter 307 superposes the first two-time diffracted light LA2 and the second two-time diffracted light LB2 to obtain the interference light Ld. The interference light Ld is emitted from the beam splitter 307 and is incident upon the light-receiving section 310. The light-receiving section 310 is connected to the displacement calculation section 4.

The configuration of the light-receiving section 310 is similar to the configuration of the first light-receiving section 18 and second light-receiving section 19 of the displacement detecting section 9 illustrated in FIG. 2, and thus, here, the description thereof is omitted. Since the other configuration is the same as the displacement detecting section 9 illustrated in FIG. 2, the description thereof is omitted. An operational effect similar to the above-described displacement detecting section 9 illustrated in FIG. 2 can be obtained also using the displacement detecting section 300 having such a configuration.

As described above, as with the displacement detecting section 30 according to the first modification and the displacement detecting section 300 according to the second modification, various displacement detecting sections can be applicable to the displacement detecting section in the displacement detecting device of the present invention.

Next, a displacement detecting device according to a second exemplary embodiment of the present invention will be described with reference to FIG. 10 and FIGS. 11A and 11B.

Figure 10:
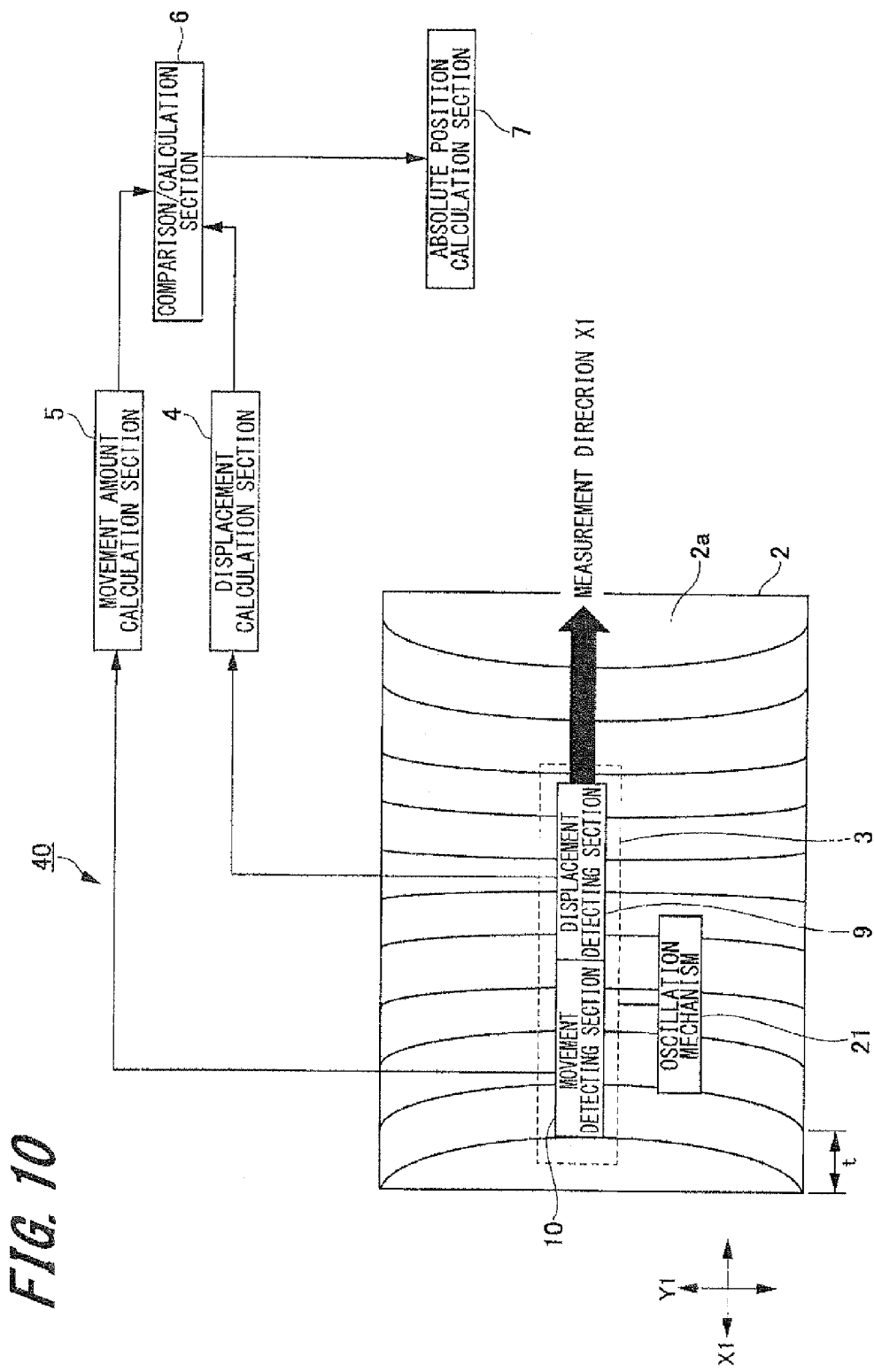
FIG. 10 is a schematic configuration diagram illustrating the configuration of a displacement detecting device in a second exemplary embodiment of the present invention.
Figure 11A:
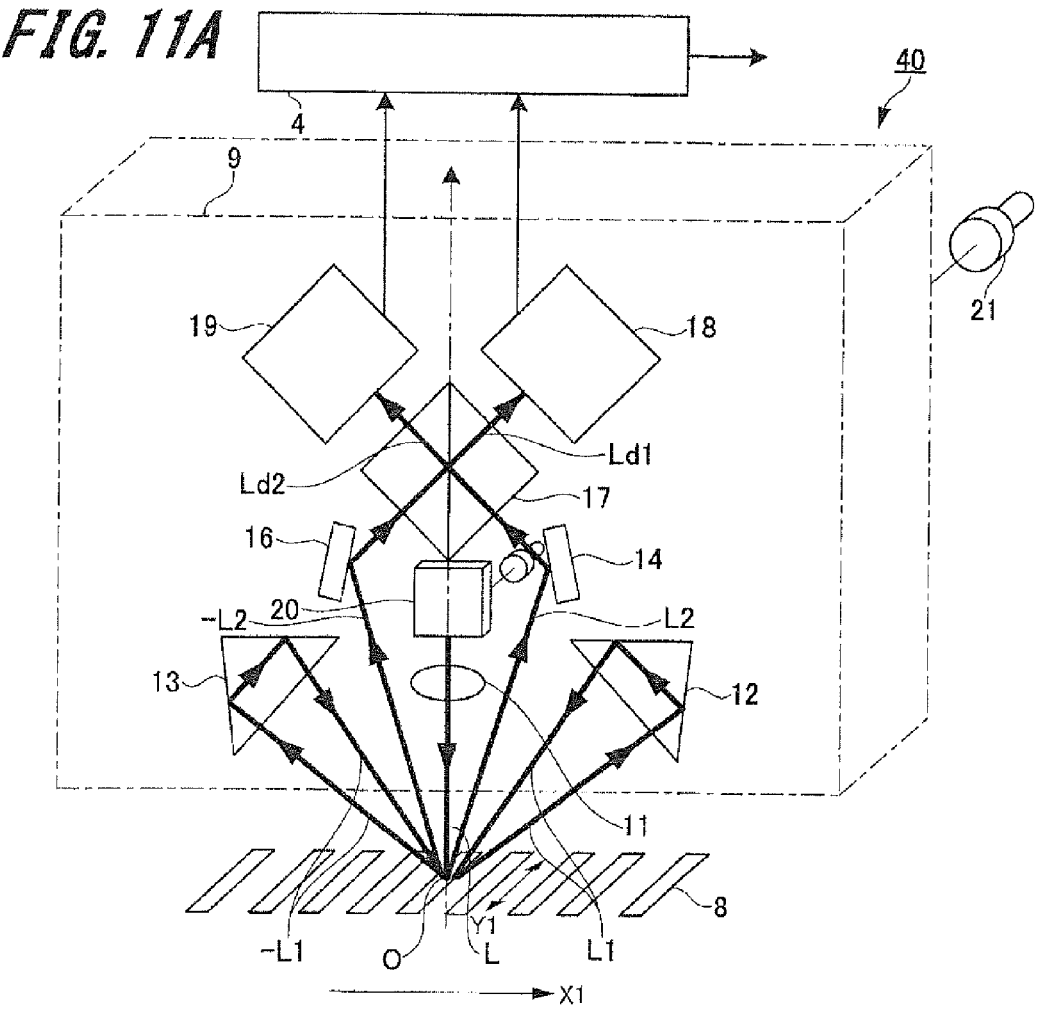
Figure 11B:
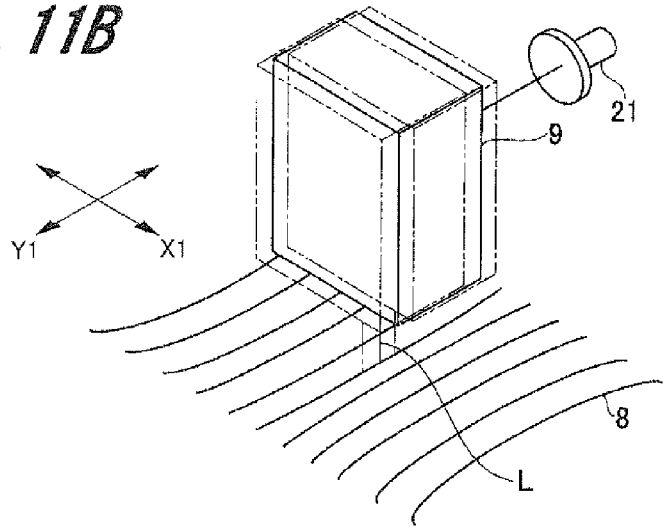

FIG. 10 is a schematic configuration diagram illustrating the configuration of a displacement detecting device 40 according to the second exemplary embodiment, and FIG. 11A and FIG. 11B are schematic configuration diagrams illustrating a displacement detecting section of the displacement detecting device 40 according to the second exemplary embodiment.

The displacement detecting device 40 according to the second exemplary embodiment differs from the displacement detecting device 1 according to the first exemplary embodiment in that an oscillation mechanism is provided for moving the detection head 3 in the track direction Y1. Therefore, here the oscillation mechanism is described, and a portion common to the displacement detecting device 1 according to the first exemplary embodiment is given the same reference numeral to omit the duplicated description.

As illustrated in FIG. 10 and FIG. 11A, the displacement detecting device 40 includes the scale 2, the detection head 3, the displacement detecting section 9 provided in the detection head 3, the displacement calculation section 4 connected to the detection head 3, the movement amount calculation section 5, the comparison/calculation section 6, the absolute position calculation section 7, and the movement detecting section 10. Furthermore, the displacement detecting device 40 includes an oscillation mechanism 21 connected to the detection head 3. In the second exemplary embodiment, the detection head 3 is mounted in the movement detecting section 10.

As illustrated in FIG. 11A, the oscillation mechanism 21 is connected to the displacement detecting section 9. As illustrated in FIG. 11A and FIG. 11B, the oscillation mechanism 21 oscillates the displacement detecting section 9 by a predetermined movement amount along the track direction Y1. A driving method using, for example, a piezoelectric element, a motor, a spring, or a magnetic force or electrostatic force can be considered as the oscillation mechanism 21. Furthermore, the oscillation mechanism 21 is not always required to be driven, but may be driven only in calculating absolute positional information, and the drive of the oscillation mechanism 21 may be stopped once the absolute position is detected.

Furthermore, in the above-described example, there has been described an example in which the oscillation mechanism 21 is connected to the displacement detecting section 9 to thereby oscillate the whole displacement detecting section 9 in the track direction Y1, but the invention is not limited to the above-described example. For example, the focal point O of the light source 20 may be moved in the track direction Y1, by providing the oscillation mechanism 21 in the light source 20 and by moving the light source 20 in the track direction Y1.

As illustrated in FIG. 10, the movement detecting section 10 is connected to the detection head 3. The movement detecting section 10 detects a movement amount of the displacement detecting section 9 by the oscillation mechanism 21, and outputs the movement information to the movement amount calculation section 5. Then, the movement amount calculation section 5 calculates a movement amount in the track direction Y1 in the detection head 3 based on a signal sent from the movement detecting section 10.

For example, a laser displacement gauge, an electrostatic capacitance-type displacement gage, a contact-type electric micrometer, or the like is applied as the movement detecting section 10.

Furthermore, there has been described an example in which the detection head 3 is mounted on the movement detecting section 10, but the invention is not limited to the above-described example. For example, the movement detecting section 10 may be connected to the oscillation mechanism 21 to detect the drive amount of the oscillation mechanism 21. Specifically, when the oscillation mechanism 21 is a piezoelectric element, the movement detecting section 10 detects the value of an output voltage of the piezoelectric element. Alternatively, when the oscillation mechanism 21 is a motor, the movement detecting section 10 detects an amount of stepping of the motor, and when the oscillation mechanism 21 is an electromagnet, the movement detecting section 10 detects the value of electric current of the electromagnet.

Furthermore, the displacement detecting device 40 of the example can calculate an absolute position of the detection head 3 by moving the detection head 3 in the track direction Y1 even if a foreign substance has adhered to the diffraction grating 8 and the displacement detecting section 9 has temporarily lost the detection signal, and can detect an accurate absolute position without generating a detection error.

Since the other configuration is the same as the displacement detecting device 1 according to the first embodiment, the description thereof is omitted. An operational effect similar to the above-described displacement detecting device 1 according to the first exemplary embodiment can be obtained also using the displacement detecting device 40 having such a configuration.

Next, a displacement detecting device according to a third exemplary embodiment of the present invention will be described with reference to FIG. 12.

Figure 12:
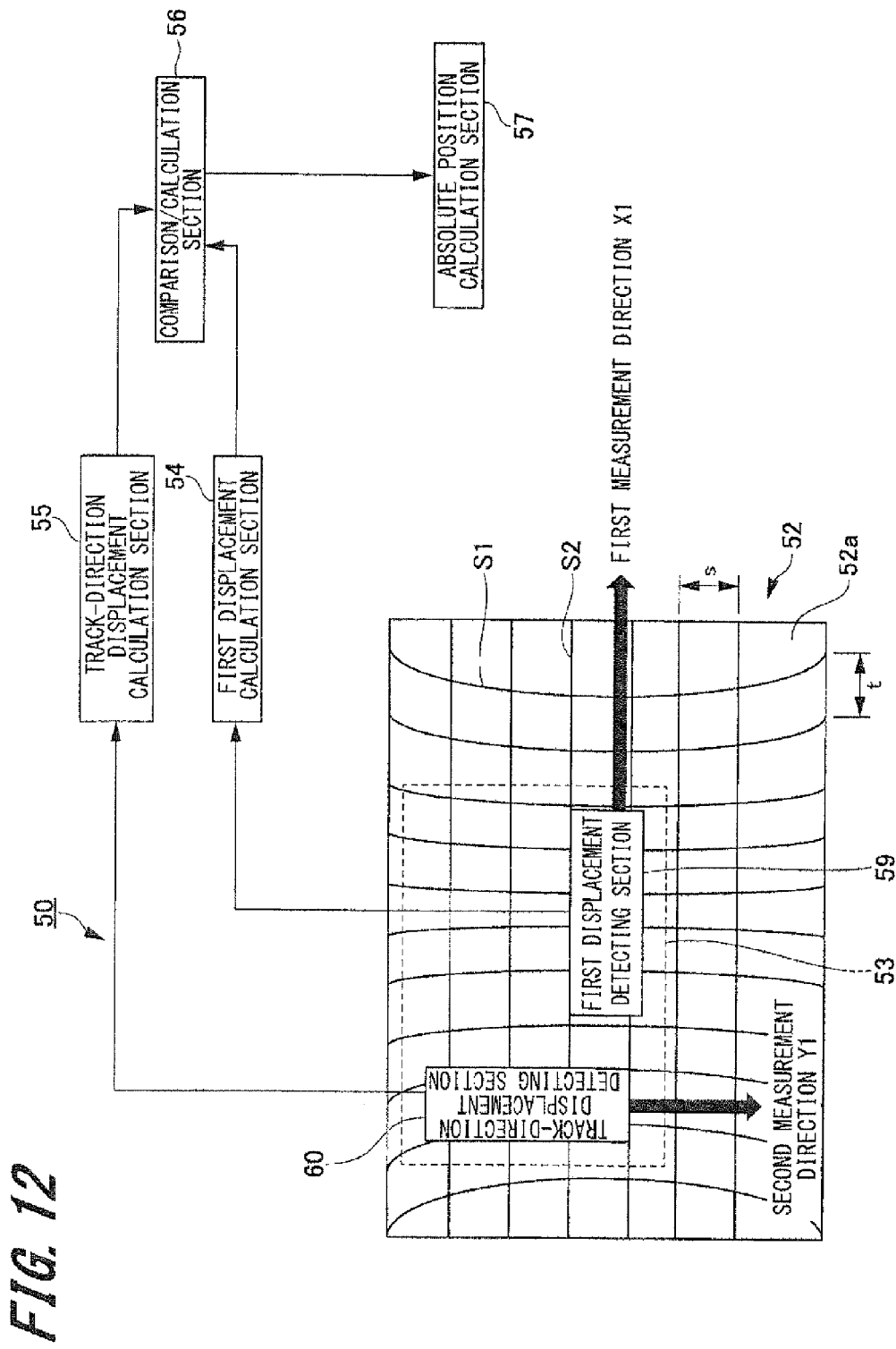
FIG. 12 is a schematic configuration diagram illustrating the configuration of a displacement detecting device in a third exemplary embodiment of the present invention.

FIG. 12 is a schematic configuration diagram illustrating the configuration of a displacement detecting device 50 according to the third exemplary embodiment.

The displacement detecting device 50 according to the third exemplary embodiment detects a displacement in the first measurement direction X1 and a displacement in the second measurement direction (track direction) Y1 that is parallel to the measurement surface of the scale and that is also perpendicular to the first measurement direction X1. Namely, the displacement detecting device 50 according to the second exemplary embodiment is a displacement detecting device capable of detecting a two-dimensional (plane) displacement and position. Note that, here, the same reference numeral is attached to a portion common to the displacement detecting device 1 according to the first exemplary embodiment, and the duplicated description is omitted.

AS illustrated in FIG. 12, the displacement detecting device 50 includes a scale 52, a detection head 53, a first displacement detecting section 59, a track-direction displacement detecting section 60, a first displacement calculation section 54 connected to the first displacement detecting section 59, a track-direction displacement calculation section 55 connected to the track-direction displacement detecting section 60, a comparison/calculation section 56, and an absolute position calculation section 57.

In a measurement surface 52a of the scale 52 formed in a substantially flat plate shape, a plurality of first slits S1 corresponding to a first scale mark is formed with the interval t along the first measurement direction X1 and a plurality of second slits S2 corresponding to a second scale mark is formed with an interval s along the second measurement direction Y1. A first diffraction grating is formed from a plurality of first slits S1, and a second diffraction grating is formed from a plurality of second slits S2.

Namely, the scale 42 according to the third exemplary embodiment is a diffraction grating that has a grid vector in two directions, i.e., the first measurement direction X1 and the second measurement direction Y1, respectively.

Since the pitch interval t in the first diffraction grating is the same as the diffraction grating 8 according to the first exemplary embodiment, the description thereof is omitted.

The pitch intervals s in the second diffraction grating are formed equal along the second measurement direction Y1.

The detection head 53 includes the first displacement detecting section 59 and the track-direction displacement detecting section 60. Since the configurations of the first displacement detecting section 59 and track-direction displacement detecting section 60 are the same as the configuration of the displacement detecting section 9 according to the first exemplary embodiment, the description thereof is omitted.

The first displacement detecting section 59 is connected to the first displacement calculation section 54, and the track-direction displacement detecting section 60 is connected to the track-direction displacement calculation section 55. A Lissajous signal obtained by the first displacement detecting section 59 is output to the first displacement calculation section 54, and a Lissajous signal obtained by the track-direction displacement detecting section 60 is output to the track-direction displacement calculation section 55.

Note that the track-direction displacement detecting section 60 corresponds to the movement detecting section 10 according to the first exemplary embodiment, and the track-direction displacement calculation section 55 corresponds to the movement amount calculation section 5 according to the first exemplary embodiment. Then, the track-direction displacement calculation section 55 calculates a displacement amount in the second measurement direction Y1 of the detection head 53, based on a detection signal of the track-direction displacement detecting section 60.

The first displacement calculation section 54 and track-direction displacement calculation section 55 are connected to the comparison/calculation section 56. Then, the comparison/calculation section 56 is connected to the absolute position calculation section 57.

In the displacement detecting device 50 according to the third exemplary embodiment, once the detection head 53 moves in the second measurement direction Y1, the comparison/calculation section 56 will differentiate, based on a displacement amount calculated by the track-direction displacement calculation section 55, a displacement amount calculated by the first displacement calculation section 54, thereby calculating a second-order differential amount. Next, the comparison/calculation section 56 outputs the calculated second-order differential amount to the absolute position calculation section 57. Then, the absolute position calculation section 57 calculates an absolute position in the first measurement direction X1 in the detection head 53, based on the input second-order differential amount.

Since the other configuration is the same as the displacement detecting device 1 according to the first embodiment, the description thereof is omitted. An operational effect similar to the above-described displacement detecting device 1 according to the first exemplary embodiment can be obtained also using the displacement detecting device 50 having such a configuration.

The displacement detecting device 50 according to the third exemplary embodiment can detect an absolute position in the first measurement direction X1 and a relative position in the second measurement direction Y1 in the detection head 53 by using the first displacement detecting section 59 and the track-direction displacement detecting section 60.

[Modification of Light Source]

Next, a modification of the configuration around the light source will be described with reference to FIG. 13 and FIG. 14.

Figure 13:
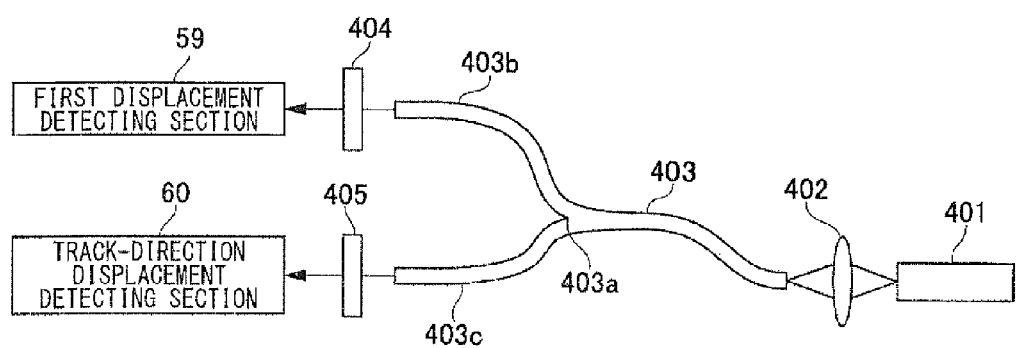
FIG. 13 is a schematic configuration diagram illustrating a modification of the configuration around a light source of the displacement detecting device in the third exemplary embodiment of the present invention.

FIG. 13 is a schematic configuration diagram illustrating the modification of the configuration around the light source.

Furthermore, in the displacement detecting device 50 according to the above-described third exemplary embodiment, there has been described an example in which the light source 20 is provided in the first displacement detecting section 59 and the track-direction displacement detecting section 60, respectively, but the invention is not limited to the above-described example. For example, as illustrated in FIG. 13, one light source 401, lens 402, and an optical fiber 403 are provided for the first displacement detecting section 59 and the track-direction displacement detecting section 60. A multi-mode fiber, or a single-mode fiber or polarization holding fiber may be applied as the optical fiber 403.

Light emitted from one light source 401 is converged by the lens 402 and is incident upon the optical fiber 403. Furthermore, the optical fiber 403 includes a branch part 403a, a first emission end 403b, and a second emission end 403c. Namely, the optical fiber 403 branches into two on the emission end side of the optical fiber 403. Then, a first polarizing plate 404 is arranged so as to face the first emission end 403b, and a second polarizing plate 405 is arranged so as to face the second emission end 403c.

The optical fiber 403 branches the incident light into two at the branch part 403a and guides one of the branched lights to the first displacement detecting section 59 and the other one of the branched lights to the track-direction displacement detecting section 60, respectively. One of the branched lights is emitted from the first emission end 403b, and the first displacement detecting section 59 is irradiated through the first polarizing plate 404. Furthermore, the other one of the branched lights is emitted from the second emission end 403c, and the track-direction displacement detecting section 60 is irradiated through the second polarizing plate 405.

As described above, the first displacement detecting section 59 and the track-direction displacement detecting section 60 are irradiated with light from one light source 401, and thus a change in temperature of the light source 401 and/or a long term change in characteristics of the light source 401 can be shared between the displacement detecting sections 59 and 60. As a result, an error caused by a difference of the light sources between the first displacement detecting section 59 and the track-direction displacement detecting section 60 can be eliminated and thus stable displacement detection becomes possible.

Furthermore, in FIG. 13, there has been described an example in which light is branched into a plurality of lights inside the optical fiber 403, but the invention is not limited to the above-described example. The light emitted from the light source 401 may be branched into a plurality of lights by using a beam splitter or the like. Note that the number of branched lights is not limited to two, and when three displacement detecting sections or four or more displacement detecting sections are provided, the number of branched lights is appropriately set in accordance with the number of the displacement detecting sections provided.

Figure 14:
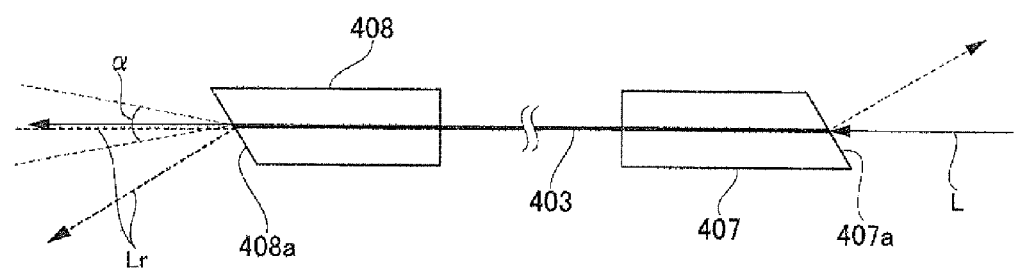
FIG. 14 is an explanatory view enlarging and illustrating a main portion illustrated in FIG. 13.

FIG. 14 is an explanatory view illustrating a main portion illustrated in FIG. 13, in an enlarged manner.

As illustrated in FIG. 14, an incident side ferrule 407 is provided on the incidence port side of the optical fiber 403, while an emission side ferrule 408 is provided on the emission port side of the optical fiber 403. An incident end face 407a, upon which the light L is incident, in the incident side ferrule 407 is inclined with respect to the optical axis. Furthermore, an emission end face 408a, from which the light L is emitted, in the emission side ferrule 408 is inclined with respect to the optical axis, as with the incident end face 407a.

Moreover, return light Lr, which is the light L emitted from the optical fiber 403 and reflected by the optical system, is incident upon the emission end face 408a. Then, the return light Lr is reflected by the emission end face 408a. Note that the emission end face 408a reflects the return light Lr to the outside of a light available area a in the optical system. This can prevent the return light Lr from being incident again upon the optical system and interfering with light that is actually used. Note that the optical system herein refers to various types of components and the diffraction grating 8 provided in the displacement detecting section 59.

Note that, in FIG. 14, an example has been described, in which the emission end face 408a is inclined with respect to the optical axis, but the invention is not limited to the above-described example. As conventionally implemented, the return light Lr may be prevented from being incident again upon the optical system, for example, by applying an antireflection film to the emission end face 408a or by using a less-reflective and permeable glass ferrule as the emission side ferrule.

Note that the configuration of the optical fiber illustrated in FIG. 13 and FIG. 14 may be applicable also to the displacement detecting section 30 according to the second modification illustrated in FIG. 8, to the displacement detecting section 300 according to the third modification illustrated in FIG. 9, and to displacement detecting devices 70, 500, and 600 according to other embodiments described later.

Next, a displacement detecting device according to a fourth exemplary embodiment of the present invention will be described with reference to FIG. 15.

Figure 15:
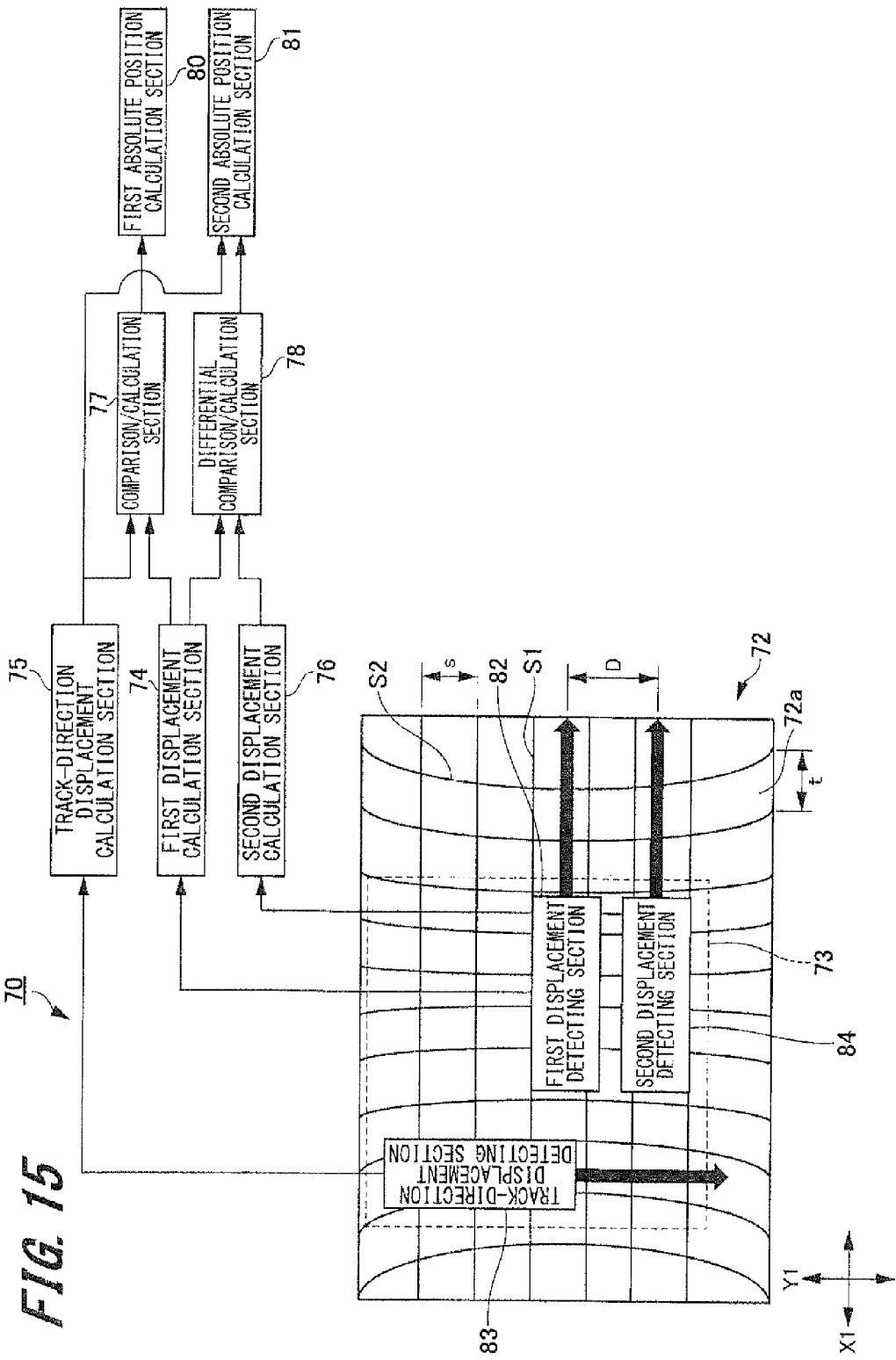
FIG. 15 is a schematic configuration diagram illustrating the configuration of a displacement detecting device in a fourth exemplary embodiment of the present invention.

FIG. 15 is a schematic configuration diagram illustrating the configuration of the displacement detecting device 70 according to the fourth exemplary embodiment.

The displacement detecting device 70 according to the fourth exemplary embodiment is constituted by providing a second displacement detecting section in the displacement detecting device 50 according to the third exemplary embodiment. Therefore, here, the same reference numeral is attached to a portion common to the displacement detecting device 50 according to the third exemplary embodiment and the duplicated description is omitted.

As illustrated in FIG. 15, the displacement detecting device 70 includes a scale 72, a detection head 73, a first displacement detecting section 82, a track-direction displacement detecting section 83, a second displacement detecting section 84, a first displacement calculation section 74, a track-direction displacement calculation section 75, and a second displacement calculation section 76. Furthermore, the displacement detecting device 70 includes a comparison/calculation section 77, a differential comparison/calculation section 78, a first absolute position calculation section 80, and a second absolute position calculation section 81.

Since the configurations of the scale 72, comparison/calculation section 77, and first absolute position calculation section 80 are the same as those of the scale 42, comparison/calculation section 46, and absolute position calculation section 47 of the displacement detecting device 40 according to the second exemplary embodiment, the description thereof is omitted.

As illustrated in FIG. 15, the second displacement detecting section 84 is arranged spaced apart by a predetermined interval D along the second measurement direction Y1 with respect to the first displacement detecting section 82. The second displacement detecting section 84 is connected to the second displacement calculation section 76. Since the configurations of the second displacement detecting section 84 and second displacement calculation section 76 are the same as those of the first displacement detecting section 82 and first displacement calculation section 74, the description thereof is omitted. In addition, the first displacement detecting section 82, first displacement calculation section 74, second displacement detecting section 84, and second displacement calculation section 76 detect a displacement of the pitch interval t of the first slit S1 and calculate relative positional information in the first measurement direction X1. The track-direction displacement detecting section 83 and track-direction displacement calculation section 75 detect a displacement of the pitch interval s of the second slit S2, and calculate relative positional information in the second measurement direction Y1.

The first displacement calculation section 74 and second displacement calculation section 76 are connected to the differential comparison/calculation section 78. Then, the differential comparison/calculation section 78 is connected to the second absolute position calculation section 81. The displacement detecting device 70 according to the fourth exemplary embodiment can detect not only an absolute position in the first measurement direction X1 but also an absolute position in the second measurement direction Y1. Note that a method for detecting an absolute position in the first measurement direction X1 is the same as that of the displacement detecting device 40 according to the third exemplary embodiment, and thus the description thereof is omitted. Here, a method for detecting an absolute position in the second measurement direction Y1 will be described.

As described above, the integration of pitch intervals t of the first diffraction grating is set so as to be able to be approximated by a third order polynomial expression with respect to a coordinate in the first measurement direction X1 in the scale 72, and the integration of pitch intervals s of the second diffraction grating is set so as to be able to be approximated by a second-order polynomial expression with respect to a coordinate in the second measurement direction Y1 in the scale 72. Then, the output value (displacement amount) fy(x,y) of the first displacement calculation section 74 when the detection head 73 is moved in the second measurement direction Y1 can be expressed by Formula 2 described above. At this time, when focusing attention on the second displacement detecting section 84, the output value (displacement amount) of the second displacement calculation section 76 can be expressed by Formula 3 below.

$$fy(x,y+D)=G+H(y+D)+I(y+D)^2+Jx(y+D)+Kx(y+D)^2 \quad \text{[Formula 3]}$$

Figure 16:
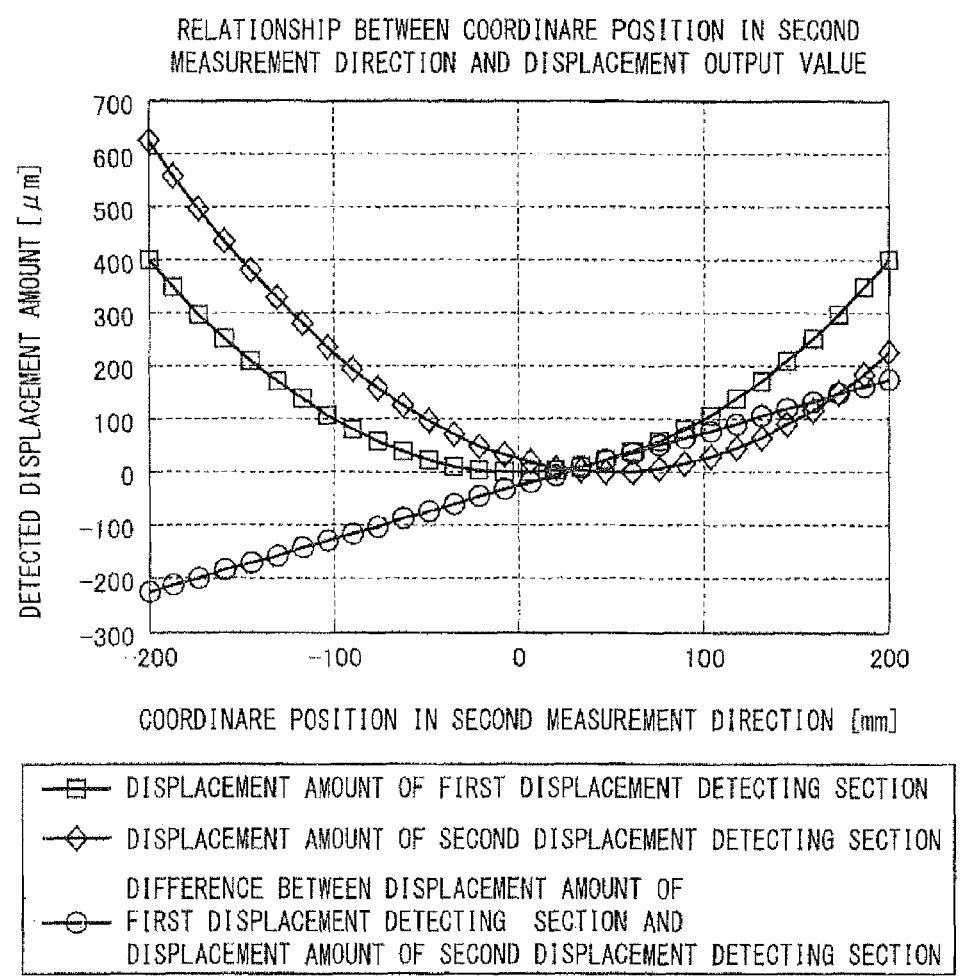
FIG. 16 is a graph illustrating a relationship between a displacement in the track direction of the displacement detecting device, an output value of a first displacement detecting section, an output value of a second displacement detecting section, and a difference between the output values, in the fourth exemplary embodiment of the present invention.

FIG. 16 is a graph illustrating a relationship between a coordinate position in the second measurement direction, a displacement amount of the first displacement detecting section, a displacement amount of the second displacement detecting section, and a difference between the displacement amount of the first displacement detecting section and the displacement amount of the second displacement detecting section.

As illustrated in FIG. 16, the difference between the displacement amount of the first displacement detecting section 82 and the displacement amount of the second displacement detecting section 84 can be expressed by a linear function proportional to the coordinate (measurement position) y in the second measurement direction Y1. Therefore, the measurement position in the second measurement direction Y1 is uniquely determined by the difference.

Namely, the differential comparison/calculation section 78 calculates a difference between a displacement amount calculated by the first displacement calculation section 74 and a displacement amount calculated by the second displacement calculation section 76. Then, the differential comparison/calculation section 78 outputs the calculated difference to the second absolute position calculation section 81. Information indicative of a relationship between a difference between a displacement amount calculated by the first displacement calculation section 74 and a displacement amount calculated by the second displacement calculation section 76 and a measurement position in the second measurement direction Y1 is stored in the second absolute position calculation section 81 in advance. Accordingly, the second absolute position calculation section 81 calculates an absolute position in the second measurement direction Y1 of the scale 72 in the detection head 73, based on a difference calculated by the differential comparison/calculation section 78, and outputs the same. Therefore, the detection operation of detecting an absolute position in the second measurement direction Y1 in the detection head 3 using the displacement detecting device 70 according to the fourth exemplary embodiment is completed.

Since the other configuration is the same as that of the displacement detecting device 1 according to the first embodiment and the displacement detecting device 50 according to the third exemplary embodiment, the description thereof is omitted. An operational effect similar to the above-described displacement detecting device 1 according to the first exemplary embodiment can be obtained also using the displacement detecting device 70 having such a configuration.

Furthermore, in the displacement detecting device 70 according to the fourth exemplary embodiment, there has been described an example in which an absolute position in the first measurement direction X1 is calculated by differentiating a displacement amount of the first displacement detecting section 82 that detects a relative position in the first measurement direction X1, but the invention is not limited to the above-described example.

For example, when the detection head 73 moves in the second measurement direction Y1, the differential comparison/calculation section 78 calculates a difference between a displacement amount calculated by the first displacement calculation section 74 and a displacement amount calculated by the second displacement calculation section 76. Next, the calculated difference is differentiated, based on relative positional information in the second measurement direction Y1 calculated by the track-direction displacement calculation section 75. Note that the calculated differential amount is proportional to the measurement position in the first measurement direction X1. Therefore, an absolute position in the first measurement direction X1 may be calculated based on the calculated differential amount.

Furthermore, the displacement detecting device 70 according to the fourth exemplary embodiment can detect a gradient of the detection head 73 in the first measurement direction X1, based on the detection signals of the first displacement detecting section 82 and second displacement detecting section 84.

In addition, as described above, a difference between a displacement amount calculated the by first displacement calculation section 74 and a displacement amount calculated by the second displacement calculation section 76 is proportional to the measurement position in the second measurement direction Y1. Therefore, even if no signal is output from the track-direction displacement detecting section 83 due to some sort of failures, a movement in the second measurement direction Y1 of the scale 72 with respect to the detection head 73 can be detected from a change in the difference between a displacement amount calculated by the first displacement calculation section 74 and a displacement amount calculated by the second displacement calculation section 76.

Next, a displacement detecting device according to a fifth exemplary embodiment of the present invention will be described with reference to FIG. 17 and FIG. 18.

Figure 17:
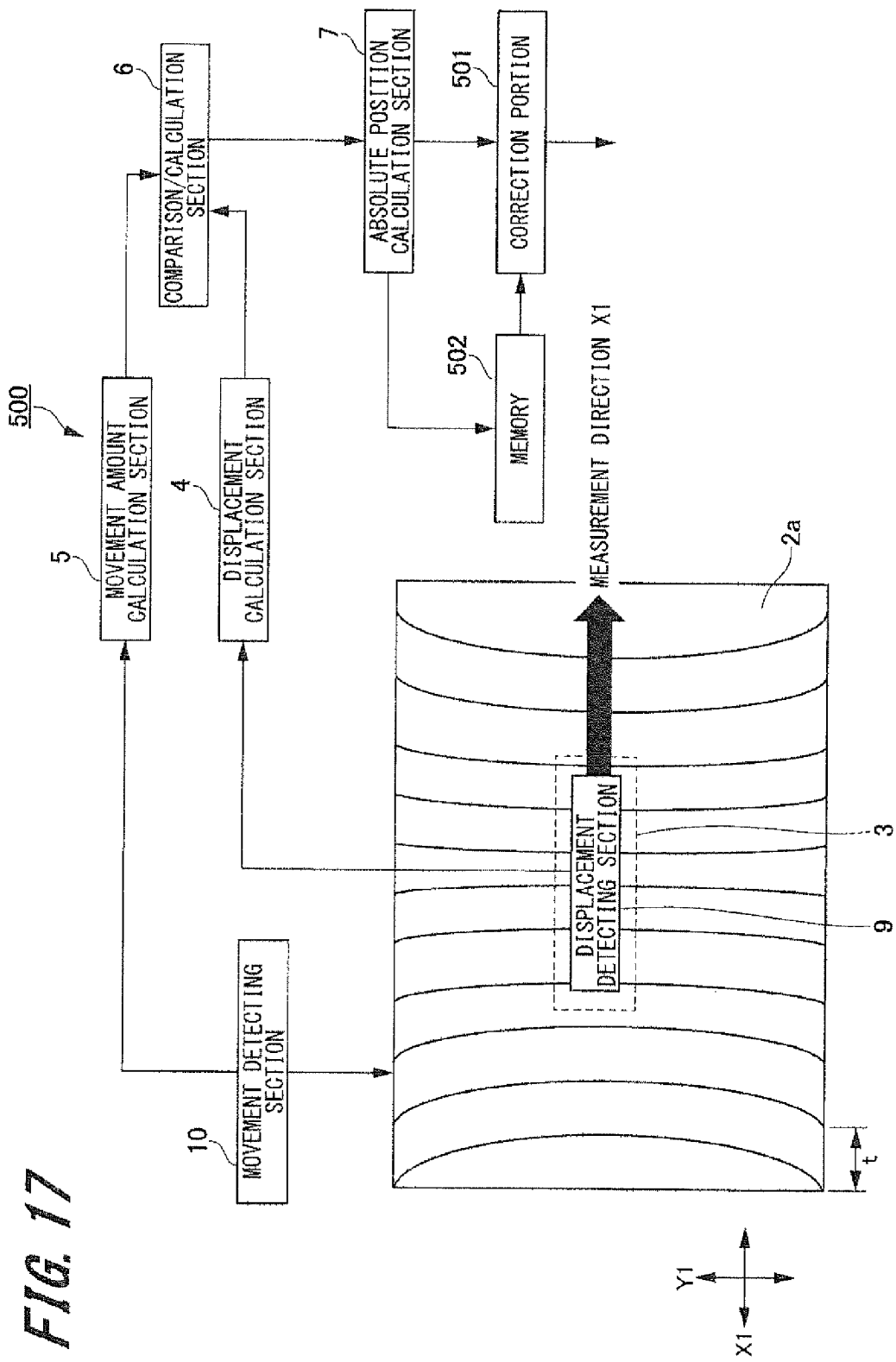
FIG. 17 is a schematic configuration diagram illustrating the configuration of a displacement detecting device in a fifth exemplary embodiment of the present invention.

FIG. 17 is a schematic configuration diagram illustrating the configuration of the displacement detecting device 500 according to the fifth exemplary embodiment. FIG. 18 illustrates an example of a data table stored in a memory of the displacement detecting device 500 according to the fifth exemplary embodiment.

The displacement detecting device 500 according to the fifth exemplary embodiment is provided with a correction portion 501 and memory 502 in the displacement detecting device 1 according to the first exemplary embodiment. Therefore, here, the correction portion 501 and memory 502 will be described, and the same reference numeral is attached to a portion common to the displacement detecting device 1 according to the first exemplary embodiment and the duplicated description is omitted.

As illustrated in FIG. 17, the correction portion 501 is connected to the absolute position calculation section 7. An absolute position of the detection head 3 with respect to the scale 2 is input to the correction portion 501 from the absolute position calculation section 7. The memory 502 is connected to the absolute position calculation section 7 and correction portion 501. Then, the correction portion 501 corrects the absolute position, based on the input absolute position and on correction data stored in the memory 502, and outputs the corrected absolute position.

As illustrated in FIG. 18, a correction value table is stored in the memory 502. The correction value table specifies a correction value that is used by the correction portion 501 in accordance with an absolute position of the scale 2. Here, a change in the integration of the pitch intervals t of the scale 2 generates an error with respect to Formula 1 that is an approximate expression of the above-described second-order polynomial expression, due to unevenness of a thickness of the scale body, polishing unevenness with respect to the measurement surface 2a at the time of preparation, and the like. Therefore, correction values for canceling errors are stored in the memory 502 in advance.

Then, the correction portion 501 obtains a correction value from the correction value table in accordance with an absolute position of the detection head 3 with respect to the scale 2. The correction portion 501 adds the obtained correction value to an absolute position calculated by the absolute position calculation section 7 and corrects the error.

Therefore, a very small error that cannot be approximated by the above-described Formula 1 can also be corrected and more accurate displacement detection can be performed.

Since the other configuration is the same as the displacement detecting device 1 according to the first embodiment, the description thereof is omitted. An operational effect similar to the above-described displacement detecting device 1 according to the first exemplary embodiment can be obtained also using the displacement detecting device 500 having such a configuration.

Next, a displacement detecting device according to a sixth exemplary embodiment of the present invention will be described with reference to FIG. 19 to FIG. 21.

Figure 19:
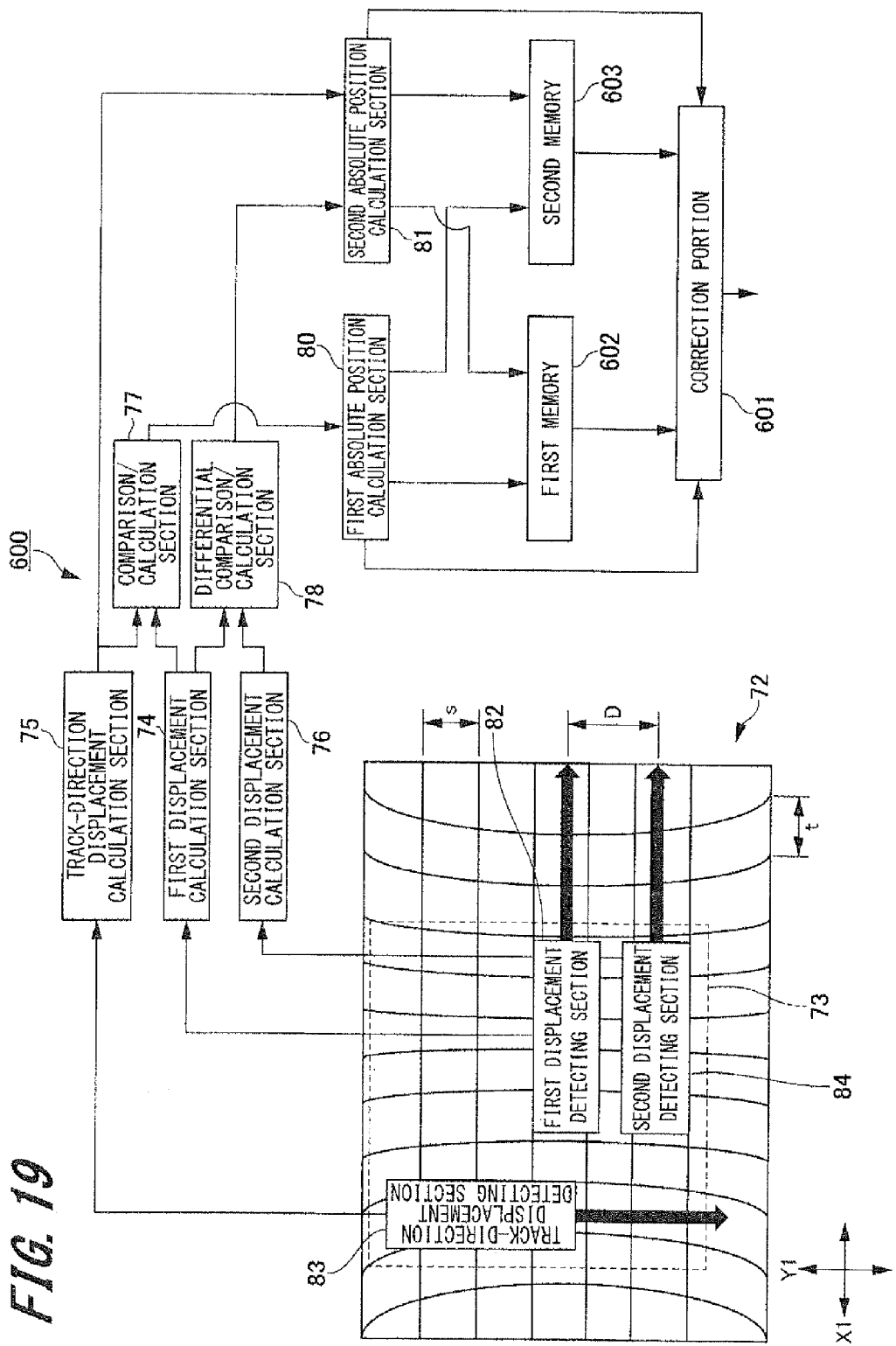
FIG. 19 is a schematic configuration diagram illustrating the configuration of a displacement detecting device in a sixth exemplary embodiment of the present invention.

FIG. 19 is a schematic configuration diagram illustrating the configuration of the displacement detecting device 600 according to the sixth exemplary embodiment. FIG. 20 illustrates an example of a data table stored in a first memory of the displacement detecting device 600 according to the sixth exemplary embodiment. FIG. 21 illustrates an example of a data table stored in a second memory of the displacement detecting device 600 according to the sixth exemplary embodiment.

The displacement detecting device 600 according to the sixth exemplary embodiment is constituted by providing a correction portion 601, a first memory 602, and a second memory 603 in the displacement detecting device 70 according to the fourth exemplary embodiment. Furthermore, the correction portion 601 is similar to the correction portion 501 of the displacement detecting device 500 according to the fifth exemplary embodiment. Therefore, here, the correction portion 601, first memory 602, and second memory 603 are described. The same reference numeral is attached to a portion common to the displacement detecting device 70 according to the fourth exemplary embodiment and the duplicated description is omitted.

As illustrated in FIG. 19, the correction portion 601 is connected to the first absolute position calculation section 80 and second absolute position calculation section 81. Furthermore, the first memory 602 and second memory 603 are connected to the first absolute position calculation section 80 and second absolute position calculation section 81 and to the correction portion 601. An absolute position in the first measurement direction X1 is input to the correction portion 601 from the first absolute position calculation section 80, and an absolute position in the second measurement direction Y1 is input to the correction portion 601 from the second absolute position calculation section 81.

As illustrated in FIG. 20, a correction value table in the first measurement direction X1 is stored in the first memory 602. The correction value table in the first measurement direction X1 specifies a correction value in the first measurement direction X1 in accordance with an absolute position in the first measurement direction X1 and absolute position in the second measurement direction Y1 of the scale 72.

In addition, as illustrated in FIG. 21, a correction value table in the second measurement direction Y1 is stored in the second memory 603. The correction value table in the second measurement direction Y1 specifies a correction value in the second measurement direction Y1 in accordance with an absolute position in the first measurement direction X1 and absolute position in the second measurement direction Y1 of the scale 72.

As illustrated in FIG. 19, the correction portion 601 obtains a correction value in the first measurement direction X1 and a correction value in the second measurement direction Y1, from the first memory 602 and second memory 603 in accordance with the input absolute position in the first measurement direction X1 and absolute position in the second measurement direction Y1 of the detection head 73 with respect to the scale 72. Then, the correction portion 601 adds the obtained correction value to the absolute position calculated by the first absolute position calculation section 80 and second absolute position calculation section 81, thereby correcting an error.

Since the other configuration is the same as the displacement detecting device 1 according to the first embodiment, the description thereof is omitted. An operational effect similar to the above-described displacement detecting device 1 according to the first exemplary embodiment can be obtained also using the displacement detecting device 600 having such a configuration.

Next, modifications of the scale will be described with reference to FIG. 22A to FIG. 26.

Scales illustrated in FIG. 22A to FIG. 26 are scales each having a diffraction grating with two grid vectors of a first grid vector M1 along the first measurement direction X1 and a second grid vector N1 along the second measurement direction Y1.

Figure 22A:
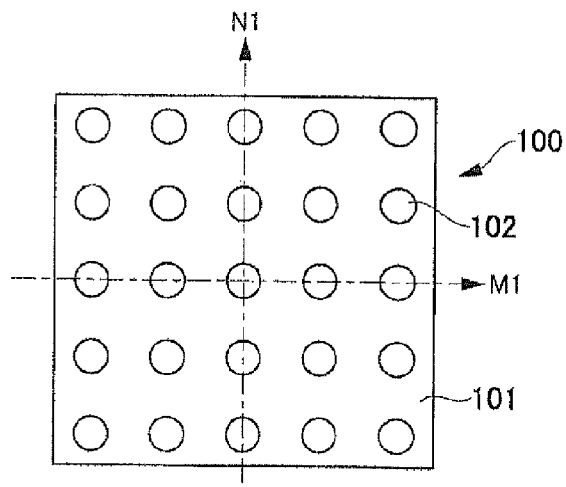
Figure 22B:
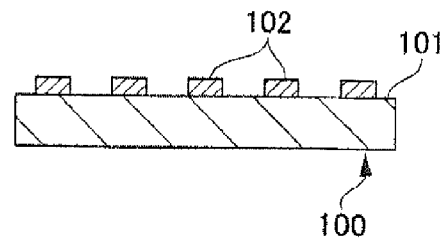

FIG. 22A is an enlarged plan view of a scale according to a first modification, and FIG. 22B is an enlarged cross-sectional view of the scale according to the first modification.

As illustrated in FIG. 22A and FIG. 22B, in a scale 100 according to the first modification, a plurality of substantially cylindrical projections 102 each substantially perpendicularly projecting from one surface of a substrate 101 is provided. The plurality of projections 102 is arranged spaced apart from each other in a grid pattern along the first grid vector M1 and second grid vector N1.

Figure 23A:
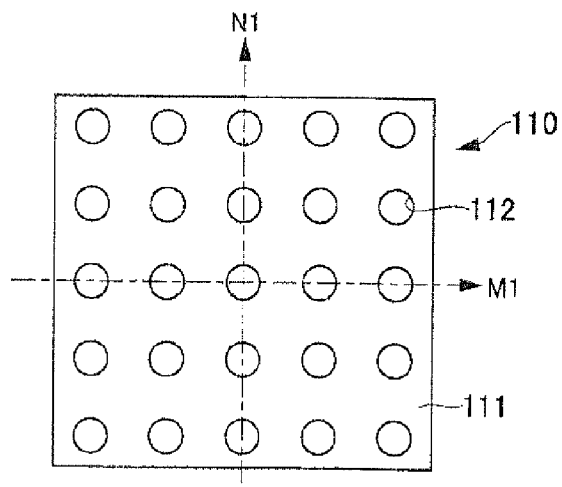
Figure 23B:
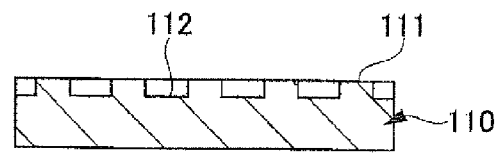

FIG. 23A is an enlarged plan view of a scale according to a second modification, and FIG. 23B is an enlarged cross-sectional view of the scale according to the second modification.

As illustrated in FIG. 23A and FIG. 23B, a plurality of concave portions 112 each substantially cylindrically dented from one surface of a substrate 111 is provided in a scale 110 according to the second modification. The plurality of concave portions 112 is arranged spaced apart from each other in a grid pattern along the first grid vector M1 and second grid vector N1. In addition, a gap formed between the plurality of concave portions 112 serves as the slit of the grid, in the scale 110.

Figure 24A:
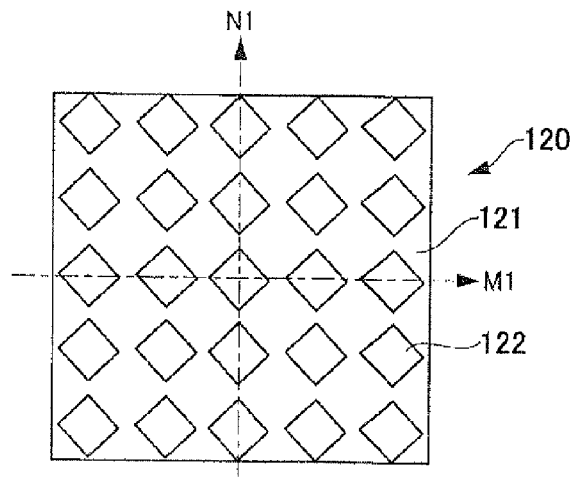
Figure 24B:
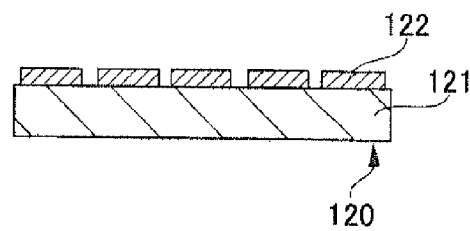

FIG. 24A is an enlarged plan view of a scale according to a third modification, and FIG. 24B is an enlarged cross-sectional view of the scale according to the third modification.

As illustrated in FIG. 24A and FIG. 24B, a plurality of substantially square columnar projections 122 each substantially perpendicularly projecting from one surface of a substrate 121 is provided in a scale 120 according to the third modification. The plurality of projections 122 are arranged spaced apart from each other in a grid pattern along the first grid vector M1 and second grid vector N1.

As illustrated in FIG. 24A, the plane directions of two opposing side faces of each of the plurality of projections 122 are inclined with respect to the first grid vector M1 and second grid vector N1.

Figure 25A:
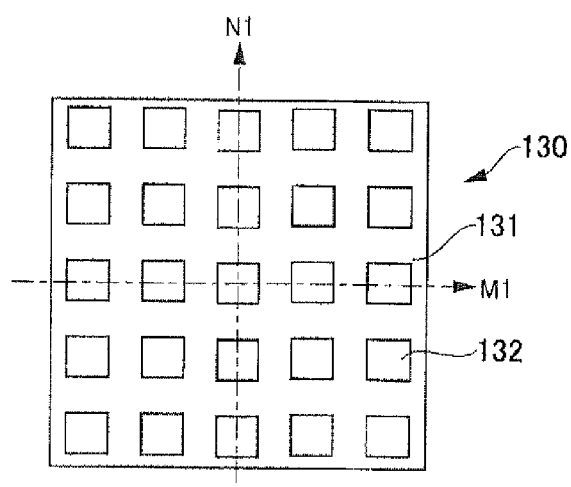

FIG. 25A is an enlarged plan view of a scale according to a fourth modification, and FIG. 24B is an enlarged cross-sectional view of the scale according to the fourth modification.

Figure 25B:
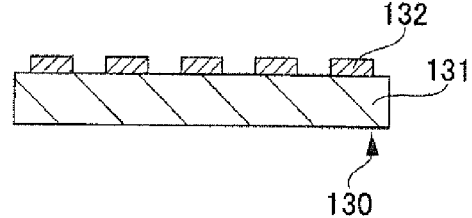

As illustrated in FIG. 25A and FIG. 25B, a plurality of substantially square columnar projections 132 each substantially perpendicularly projecting from one surface of a substrate 131 is provided in a scale 130 according to the fourth modification. The plurality of projections 132 is arranged spaced apart from each other in a grid pattern along the first grid vector M1 and second grid vector N1.

As illustrated in FIG. 25A, the plane directions of two opposing side faces of each of the plurality of projections 132 are arranged along the first grid vector M1 and second grid vector N1, respectively.

Figure 26:
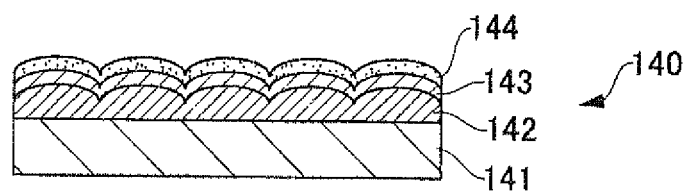
FIG. 26 is an enlarged cross-sectional view illustrating a fifth modification of the scale of the displacement detecting device in the exemplary embodiment of the present invention.

FIG. 26 is an enlarged cross-sectional view of a scale according to a fifth modification.

Note that, in the scales 100, 120, and 130 according to the first modification, third modification, and fourth modification described above, the cross-sectional shapes of the projections 102, 122, and 132 are formed in rectangular shape. However, the cross-sectional shapes of the projections 102, 122, and 132 are not limited to the rectangular shape. For example, in a scale 140 illustrated in FIG. 26, a projection 142, whose cross-sectional shape is sinusoidally formed, projects from one surface of a substrate 141.

In addition, a reflection film 143 is formed on the surface of the projection 142 of the scale 140. The examples of the quality of the material of the reflection film 143 include gold (Au), silver (Ag), aluminum (Al), chromium (Cr), and the like. The provision of the reflection film 143 makes it possible to enhance diffraction efficiency. Note that, also in the scales 100 to 130 according to the first to fourth modifications, a reflection film may be provided on the surface.

Furthermore, a protection layer 144 is formed on the reflection film 143 of the scale 140. The examples of the quality of the material of the protection layer 144 include silicon dioxide ($SiO_2$), carbon (C), $MgF_2$ (magnesium fluoride), Ti (titanium), and the like. Then, the protection layer 144 is formed, for example, by vapor deposition, sputtering, CVD, or the like. The provision of the protection layer 144 makes it possible to enhance the handleability of the scale. Furthermore, also in the scales 100 to 130 according to the first to fourth modifications, a protection layer may be provided on the surface.

In addition, ceramic, glass, metal, resin, or the like is used as the quality of the material of the substrates 101 to 141 of the above-described scales 100 to 140. Furthermore, the projections 102, 122, 132, and 142 and concave portion 112 of the above-described scales 100 to 140 may be formed, for example, by etching a metal film including chromium or the like, or may be formed of silicon, epoxy resin, or the like by imprinting. Moreover, the projections 102, 122, 132, and 142 and concave portion 112 of the above-described scales 100 to 140 may have a gelatinous texture of a photographic plate or the like.

Note that the present invention is not limited to the embodiments that are described above and illustrated in the drawings, but various modifications are possible without departing from the gist of the invention described in the claims. For example, in the above-described embodiments, there has been described an example in which an optical displacement detecting device is used as the displacement detecting device, but the invention is not limited to the above-described example. The present invention is applicable also to a magnetic displacement detecting device.

REFERENCE SIGNS LIST 1, 40, 50, 70, 500, 600 displacement detecting device,
2, 42, 72 scale,
2a, 42a, 72a measurement surface,
3, 43, 73 detection head,
4, 44, 74 first displacement calculation section,
5 movement amount calculation section,
6, 46, 77 comparison/calculation section,
7, 47, 80 absolute position calculation section (first absolute position calculation section),
8 diffraction grating,
9, 59, 82 first displacement detecting section,
10 movement detecting section,
21 oscillation mechanism,
60, 83 track-direction displacement detecting section
45, 75 track-direction displacement calculation section,
76 second displacement detecting section,
76 second displacement calculation section,
78 differential comparison/calculation section,
81 second absolute position calculation section,
501, 601 correction portion,
502, 602, 603 memory,
X1 measurement direction (first measurement direction),
Y1 track direction (second measurement direction),
t, s pitch interval

What is claimed is:

1. A displacement detecting device, comprising:
a scale;
scale marks that is provided in the scale, and that change so that an integration of pitch intervals along a measurement direction can be approximated by a third or more order polynomial expression and so that an integration of pitch intervals can be approximated by a second or more order polynomial expression along a track direction perpendicular to the measurement direction and parallel to a measurement surface of the scale;
a displacement detecting section that is arranged facing the measurement surface of the scale and that detects a displacement of the scale mark;
a displacement calculation section that calculates a displacement amount of the scale mark with respect to the scale, based on the displacement of the scale mark detected by the displacement detecting section;
a movement detecting section that detects a movement in the track direction with respect to the scale in the displacement detecting section;
a movement amount calculation section that calculates a displacement amount in the track direction with respect to the scale in the displacement detecting section, based on a signal detected by the movement detecting section;
a comparison/calculation section that differentiates, when the displacement detecting section or the scale moves in the track direction, a displacement amount calculated by the displacement calculation section, based on a movement amount in the track direction with respect to the scale calculated by the movement amount calculation section, thereby calculating a second-order differential amount in the track direction; and
an absolute position calculation section that calculates an absolute position in the measurement direction with respect to the scale based on the second-order differential amount calculated by the comparison/calculation section and that outputs the absolute position.

2. The displacement detecting device according to claim 1, wherein
the scale mark is a first scale mark, and
a second scale mark having an equally spaced pitch along the track direction is provided in the scale, the displacement detecting device further comprising:
a track-direction displacement detecting section that is arranged facing the measurement surface of the scale and that detects a displacement of the second scale mark; and a track-direction displacement calculation section that calculates a displacement amount with respect to the scale in the track direction based on a displacement of the second scale mark detected by the track-direction displacement detecting section, wherein the comparison/calculation section differentiates a displacement amount calculated by the displacement calculation section, based on a displacement amount with respect to the scale in the track direction calculated by the tack-direction displacement calculation section.

3. The displacement detecting device according to claim 2, wherein the track-direction displacement detecting section is the movement detecting section, and the track-direction displacement calculation section is the movement amount calculation section.

4. The displacement detecting device according to claim 1, further comprising:

a second displacement detecting section that is arranged facing the measurement surface of the scale, that is arranged spaced apart by a predetermined interval in the track direction from the displacement detecting section, and that detects a displacement of the scale mark; and a second displacement calculation section that calculates a displacement amount with respect to the scale of the scale mark, based on a displacement of the scale mark detected by the second displacement detecting section.

5. The displacement detecting device according to claim 4, further comprising:

a differential comparison/calculation section configured to calculate, when the displacement detecting section and the second displacement detecting section move in the track direction, a difference per unit displacement between a displacement amount calculated by the displacement calculation section and a displacement amount calculated by the second displacement calculation section; and a second absolute position calculation section that calculates an absolute position in the track direction of the scale, based on the difference calculated by the differential comparison/calculation section and on a movement amount with respect to the scale in the track direction calculated by the track-direction displacement calculation section, and that outputs the absolute position.

6. The displacement detecting device according to claim 1, further comprising an oscillation mechanism for oscillating the displacement detecting section with a predetermined movement amount along the track direction.

7. The displacement detecting device according to claim 1, further comprising:

a memory having stored therein a correction value table that specifies a correction value corresponding to the absolute position; and a correction portion that corrects the absolute position calculated by the absolute position calculation section by using the correction value specified by the correction value table.

* * * * *